US009429089B2

(12) United States Patent
Nakagawa et al.

(10) Patent No.: US 9,429,089 B2
(45) Date of Patent: Aug. 30, 2016

(54) CONTROL DEVICE OF ENGINE

(75) Inventors: Shinji Nakagawa, Mito (JP); Akihito Numata, Hitachiomiya (JP); Eisaku Fukuchi, Mito (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 901 days.

(21) Appl. No.: 13/809,738

(22) PCT Filed: Jul. 13, 2011

(86) PCT No.: PCT/JP2011/065975
§ 371 (c)(1),
(2), (4) Date: Jan. 11, 2013

(87) PCT Pub. No.: WO2012/008487
PCT Pub. Date: Jan. 19, 2012

(65) Prior Publication Data
US 2013/0110378 A1    May 2, 2013

(30) Foreign Application Priority Data

Jul. 14, 2010 (JP) ................. 2010-159254

(51) Int. Cl.
*F02D 41/00* (2006.01)
*F02D 41/04* (2006.01)
*F02D 41/06* (2006.01)
*F02D 41/08* (2006.01)
*F02D 41/14* (2006.01)
*F02D 41/18* (2006.01)
*F02P 5/15* (2006.01)
*G01M 15/05* (2006.01)

(52) U.S. Cl.
CPC .............. *F02D 41/04* (2013.01); *F02D 41/06* (2013.01); *F02D 41/08* (2013.01); *F02D 41/1459* (2013.01); *F02D 41/1498* (2013.01); *F02D 41/18* (2013.01); *F02D 2200/0406* (2013.01); *F02D 2200/0414* (2013.01); *F02D 2200/101* (2013.01); *F02D 2200/1012* (2013.01); *F02P 5/15* (2013.01); *G01M 15/05* (2013.01)

(58) Field of Classification Search
CPC ......... F02D 41/04; F02D 41/06; F02D 41/08; F02D 41/181459; F02D 41/1458; F02D 41/1438; F02D 2200/1012; F02D 2200/0414; F02D 2200/101; F02D 2200/0406; F02P 5/15; G01M 15/05
See application file for complete search history.

(56) References Cited

U.S. PATENT DOCUMENTS 6,173,698 B1 * 1/2001 DeGroot et al. .............. 123/436
6,212,879 B1 * 4/2001 Nishimura et al. ............. 60/274
6,237,327 B1   5/2001 Nishimura et al.

(Continued)

FOREIGN PATENT DOCUMENTS

JP   9-217643 A   8/1997
JP   11-107822 A  4/1999
JP   2007-170363 A  7/2007

*Primary Examiner* — Hieu T Vo
*Assistant Examiner* — Sherman Manley
(74) *Attorney, Agent, or Firm* — Crowell & Moring LLP

(57) ABSTRACT

A control device of an engine includes means for detecting an efficiency of the engine, means for detecting a combustion stability of the engine, means for detecting an HC discharged quantity, and means for executing a notification. The notification is executed when the efficiency of the engine and the combustion stability of the engine do not fall in a predetermined region A1. The predetermined region A1 is a range of the efficiency of the engine and the combustion stability of the engine. The HC discharged quantity at the time of engine start is a predetermined value or less.

15 Claims, 26 Drawing Sheets

(56) References Cited

U.S. PATENT DOCUMENTS

| | | |
|---|---|---|
| 7,505,845 B2* | 3/2009 | Yasuda et al. ................ 701/103 |
| 2002/0095977 A1* | 7/2002 | Maloney et al. ............... 73/116 |
| 2005/0193804 A1* | 9/2005 | Kokubo ...................... 73/35.12 |
| 2013/0245921 A1* | 9/2013 | Glugla et al. ................. 701/105 |
| 2013/0275024 A1* | 10/2013 | Nakagawa et al. ........... 701/102 |

* cited by examiner

<EFFICIENCY INDEX CALCULATION UNIT>

CONTROL DEVICE OF ENGINE

TECHNICAL FIELD

The present invention relates to an exhaust performance diagnosis/control device of an engine, and relates specifically to a control device that diagnoses exhaust deterioration at the time of engine start or reduces exhaust gas at the time of start.

BACKGROUND ART

Against the background of global environmental problems, reduction of exhaust gas is required for automobiles. Technologies on a diagnosing function monitoring exhausting performance in a practical use environment on a real-time basis and notifying a driver of deterioration of the exhaust performance to a constant level or above have been developed until now.

By highly efficiently utilizing a catalyst furnished in an exhaust pipe, nearly 100% of exhaust gas components of HC, CO, NOx can be purified. Because a catalyst is activated and exerts purification performance when its temperature becomes 200-300° C. or above, exhaust performance from the time of engine start to activation of the catalyst predominantly determines exhaust performance of the engine. Accordingly, monitoring of the exhaust performance at the time of engine start on a real-time basis becomes important. At the time of engine start, HC performance is particularly important. In JP-A No. 2007-170363, a means is disclosed which diagnoses presence/absence of abnormality of a rapid catalyst warm-up control means based on a ratio of engine load and engine speed during idling operation.

CITATION LIST

Patent Literature

Patent Literature 1: Japanese Unexamined Patent Application Publication No. 2007-170363

SUMMARY OF INVENTION

Technical Problems

As described above, it is important to detect the HC quantity discharged until activation of the catalyst. A technology is common in which, in order to activate a catalyst rapidly, by intentionally delaying ignition timing, efficiency of an engine is made deteriorate and exhaust gas temperature is raised. At the time of idling operation, because engine load (intake air quantity) means supplied energy and engine speed means output, a ratio of the engine speed and the intake air quantity expresses efficiency of the engine. Accordingly, as shown in FIG. 14, regardless of rich or lean of the air fuel ratio, the time to activation of the catalyst can be determined from the ratio of the engine speed and the intake air quantity. Here, the engine efficiency index is the ratio of the engine speed and the intake air quantity. On the other hand, even when the time until activation of the catalyst is constant, according to the HC quantity discharged from the engine during that time, the HC quantity discharged until activation of the catalyst changes. FIG. 15 shows the HC discharged quantity [g/s] relative to the engine efficiency index. Here, the HC discharged quantity shows the HC quantity [g] discharged from the engine per 1 s. The HC discharged quantity changes according to the air fuel ratio. Even when a fuel injection signal is constant, the combustion air fuel ratio varies due to variation of fuel characteristics, age-based deterioration of a fuel injection valve and the like, and therefore the HC quantity discharged from the engine also varies. In order to detect the HC quantity discharged until activation of the catalyst, it is necessary to detect not only the time until activation of the catalyst but also the HC quantity discharged from the engine.

Solution to Problems

As shown in FIG. 1, the present invention is a control device of an engine including a means that detects efficiency of the engine and a means that detects combustion stability of the engine.

FIG. 16 shows the relation of stability of combustion against an air fuel ratio. Here, the stability of combustion shows the standard deviation of the angular acceleration of an engine. The energy efficiency indices are shown being classified according to respective ranges shown in the drawing. The reason the stability of combustion varies in an equal air fuel ratio is because ignition timing changes. When the energy efficiency index is determined, the air fuel ratio is determined uniquely from the stability of combustion. Accordingly, when both of the energy efficiency index and the combustion stability are used, the air fuel ratio can be obtained, and the HC discharged quantity shown in FIG. 15 can be determined uniquely. When the HC discharged quantity [g] until activation of the catalyst is approximated by the product of the time [s] until activation of the catalyst multiplied by the HC discharged quantity during that time [g/s], as shown in FIG. 15, the HC discharged quantity can be determined uniquely from the energy efficiency index and the combustion stability (the standard deviation of angular acceleration).

As described above, it is possible to quantitatively detect the HC discharged quantity until activation of the catalyst from both of the efficiency of the engine and the combustion stability of the engine. The minimum constitution thereof is hereby shown.

Also, as shown in FIG. 2 with the premise of the constitution shown in FIG. 1, a preferable aspect is the control device of an engine further including a means that detects an HC discharged quantity at the time of engine start based on efficiency of the engine and combustion stability of the engine. As described above, the HC discharged quantity until activation of the catalyst is detected quantitatively from both of the efficiency of the engine and the combustion stability of the engine.

Also, as shown in FIG. 3 with the premise of the constitution shown in FIG. 1 or FIG. 2, a preferable aspect is the control device of an engine further including a means that executes notification when the efficiency of the engine and the combustion stability of the engine do not fall in a predetermined region A1. The means is provided for example which notifies a driver of an event that the HC discharged quantity has become a predetermined value or more (the exhaust performance has deteriorated) when either the efficiency of the engine or the combustion stability of the engine has deviated from the region A1 because it is possible to quantitatively detect the HC discharged quantity until activation of the catalyst from both of the efficiency of the engine and the combustion stability of the engine as described above.

Also, as shown in FIG. 4 with the premise of the constitution shown in FIG. 3, a preferable aspect is the control device of an engine in which the predetermined region A1 is a range of the efficiency of the engine and the combustion stability of the engine in which the HC discharged quantity at the time of engine start is a predetermined value or less. It is clearly stipulated hereby that the region where the energy efficiency of the engine and the combustion stability of the engine where the HC discharged quantity becomes a predetermined value or less are present is made A1.

Also, as shown in FIG. 5 with the premise of the constitution shown in any one of FIGS. 1-4, a preferable aspect is the control device of an engine in which the efficiency of the engine is obtained based on a ratio of an engine speed and an intake air quantity of the engine at the time of idling operation. As described above, at the time of idling operation, because the intake air quantity of the engine means the supplied energy and the engine speed means the output, the ratio of the engine speed and the intake air quantity expresses the efficiency of the engine.

Also, as shown in FIG. 6 with the premise of the constitution shown in any one of FIGS. 1-5, a preferable aspect is the control device of an engine in which the combustion stability of the engine is obtained based on a variation degree of angular acceleration of the engine. There is a correlation between the angular acceleration and the pressure inside the cylinder. Because the stability of combustion is the reproducibility of the pressure inside the cylinder, the combustion stability of the engine can be obtained indirectly according to the variation degree of the angular acceleration. As described above, the standard deviation, the variance and the like can be conceived with respect to the variation degree.

Also, as shown in FIG. 7 with the premise of the constitution shown in any one of FIGS. 1-6, a preferable aspect is the control device of an engine further including a means that controls the engine so that the efficiency of the engine and the combustion stability of the engine fall in a predetermined region A2. Because the HC discharged quantity until activation of the catalyst is determined quantitatively from the efficiency of the engine and the combustion stability of the engine as described above, when the operation state of the engine is controlled so that the efficiency of the engine and the combustion stability of the engine fall in a predetermined region, the HC discharged quantity at the time of start can be controlled quantitatively.

Also, as shown in FIG. 8 with the premise of the constitution shown in any one of FIGS. 1-7, a preferable aspect is the control device of an engine further including a means that controls at least either one of an air fuel ratio or ignition timing of the engine so that the efficiency of the engine and the combustion stability of the engine fall in the predetermined region A2. As described in the explanation above, when the operation state of the engine is controlled so that the efficiency of the engine and the combustion stability of the engine fall in the predetermined region, the HC discharged quantity at the time of start can be controlled quantitatively. As operational parameters for the engine, the air fuel ratio and the ignition timing are hereby clearly stipulated.

Also, as shown in FIG. 9 with the premise of the constitution shown in either FIG. 6 or 7, a preferable aspect is the control device of an engine in which the control of the engine is stopped when the combustion stability of the engine has become a predetermined value or more. As described in the explanation above, when the operation state of the engine is controlled so that the efficiency of the engine and the combustion stability of the engine fall in the predetermined region, the HC discharged quantity at the time of start can be controlled quantitatively. However, when the combustion stability of the engine has become a predetermined value or more (when the engine has become unstable) due to some disturbance in a process of controlling the efficiency of the engine to a predetermined region, securing the stability of the engine is given priority, and the engine control is stopped.

Also, as shown in FIG. 10 with the premise of the constitution shown in FIG. 8, a preferable aspect is the control device of an engine in which, when the combustion stability of the engine has become a predetermined value or more, the air fuel ratio of the engine is controlled to a rich side, or the ignition timing of the engine is controlled to an advance side. As described in the explanation above, when the operation state of the engine is controlled so that the efficiency of the engine and the combustion stability of the engine fall in the predetermined region, the HC discharged quantity at the time of start can be controlled quantitatively. However, when the combustion stability of the engine has become a predetermined value or more (when the engine has become unstable) due to some disturbance in a process of controlling the efficiency of the engine to a predetermined region, in order to improve the stability of the engine, the air fuel ratio is controlled to the rich side or the ignition timing is controlled to the advance side so as to stabilize combustion.

Also, as shown in FIG. 11 with the premise of the constitution shown in any one of FIGS. 7-10, a preferable aspect is the control device of an engine in which notification is executed when the combustion stability of the engine has become a predetermined value or more. As described in the explanation above, when the operation state of the engine is controlled so that the efficiency of the engine and the combustion stability of the engine fall in the predetermined region, the HC discharged quantity at the time of start can be controlled quantitatively. However, when the combustion stability of the engine has become a predetermined value or more (when the engine has become unstable) due to some disturbance in a process of controlling the efficiency of the engine to a predetermined region, for example, a means is hereby provided which notifies the driver of the event that the HC discharged quantity at the time of start has deteriorated because the HC discharged quantity cannot be controlled to a desired value.

Also, as shown in FIG. 12 with the premise of the constitution shown in either FIG. 3 or 4, a preferable aspect is the control device of an engine further including a means that changes the predetermined region A1 based on "an operation state of the engine" or "a diagnosis result of a means related to exhaust performance". As described above, the HC discharged quantity at the time of start is determined quantitatively from the efficiency of the engine and the combustion stability of the engine. This is on the premise of a case the operation condition of the engine, the light-off performance of the catalyst and the like are constant. The predetermined region A1 is hereby changed based on the diagnosis result of a means related to the exhaust performance such as the operation condition of the engine, the light-off performance of the catalyst and the like.

Also, as shown in FIG. 13 with the premise of the constitution shown in either FIG. 7 or 8, a preferable aspect is the control device of an engine further including a means that changes the predetermined region A1 based on "an operation state of the engine" or "a diagnosis result of a means related to exhaust performance". That is, as described above, the HC discharged quantity at the time of start is determined quantitatively from the efficiency of the engine and the combustion stability of the engine. This is on the premise of a case the operation condition of the engine, the light-off performance of the catalyst and the like are constant. The predetermined region A2 is to be changed hereby based on the diagnosis result of a means related to the exhaust performance such as the operation condition of the engine, the light-off performance of the catalyst and the like.

Advantageous Effects of Invention

According to the present invention, the HC discharged quantity at the time of start can be detected quantitatively from the efficiency of the engine and the combustion stability of the engine. Accordingly, deterioration of the HC discharged quantity at the time of start can be detected precisely and can be notified. Also, by controlling the efficiency of the engine and the combustion stability of the engine, the HC discharged quantity at the time of start can be controlled quantitatively and stable reduction of HC can be achieved.

DESCRIPTION OF EMBODIMENTS

Examples of the invention will be described in detail below.

Example 1

Figure 18:
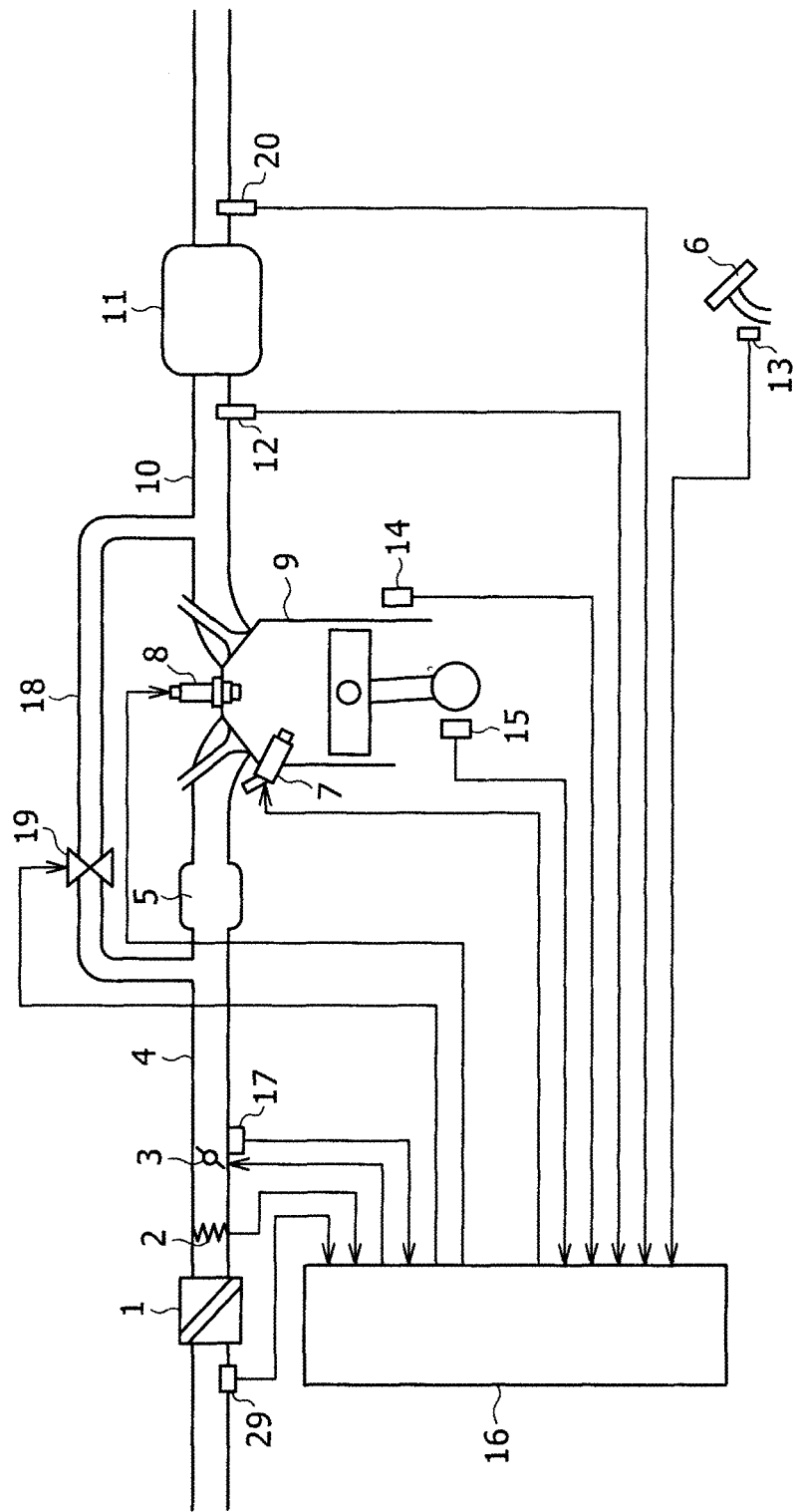
FIG. 18 is an engine control system drawing in examples 1-3.

FIG. 18 is a system drawing showing the present example. In an engine 9 formed of multiple cylinders (4 cylinders here), air from the outside passes through an air cleaner 1, goes through an intake manifold 4 and a collector 5, and flows into cylinders. The air quantity flowing in is adjusted by an electronic throttle 3. The air quantity flowing in is detected by an air flow sensor 2. Also, the intake temperature is detected by an intake temperature sensor 29. A signal of every 10° of the rotational angle of a crankshaft and a signal of every combustion period are outputted by a crank angle sensor 15. A water temperature sensor 14 detects the cooling water temperature of the engine. Also, an accelerator opening sensor 13 detects the stepping amount of an accelerator 6, and thereby detects required torque of a driver.

Respective signals of the accelerator opening sensor 13, the air flow sensor 2, the intake temperature sensor 29, a throttle valve opening sensor 17 attached to the electronic throttle 3, the crank angle sensor 15 and the water temperature sensor 14 are transmitted to a control unit 16 described below, the operation state of the engine is obtained from these sensor outputs, and main operation quantities of the engine of the air quantity, fuel injection quantity and ignition timing are calculated optimally.

The target air quantity calculated inside the control unit 16 is converted to a target throttle opening an electronic throttle drive signal, and is transmitted to the electronic throttle 3. The fuel injection quantity is converted to an open valve pulse signal, and is transmitted to a fuel injection valve (injector) 7. Also, a drive signal is transmitted to an ignition plug 8 so as to execute ignition at ignition timing calculated by the control unit 16.

Injected fuel is mixed with air from the intake manifold, flows in to inside the cylinders of the engine 9, and forms gas mixture. The gas mixture explodes by sparks generated by the ignition plug 8 at predetermined ignition timing, pushes down a piston by its combustion pressure, and becomes power of the engine. Exhaust gas after explosion is sent to a three way catalyst 11 through an exhaust gas manifold 10. A part of the exhaust gas is circulated to the intake side through an exhaust gas circulation pipe 18. The circulation quantity is controlled by an exhaust gas circulation quantity adjust valve 19.

A catalyst upstream air fuel ratio sensor 12 is attached between the engine 9 and the three way catalyst 11. A catalyst downstream $O_2$ sensor 20 is attached downstream of the three way catalyst 11.

Figure 19:
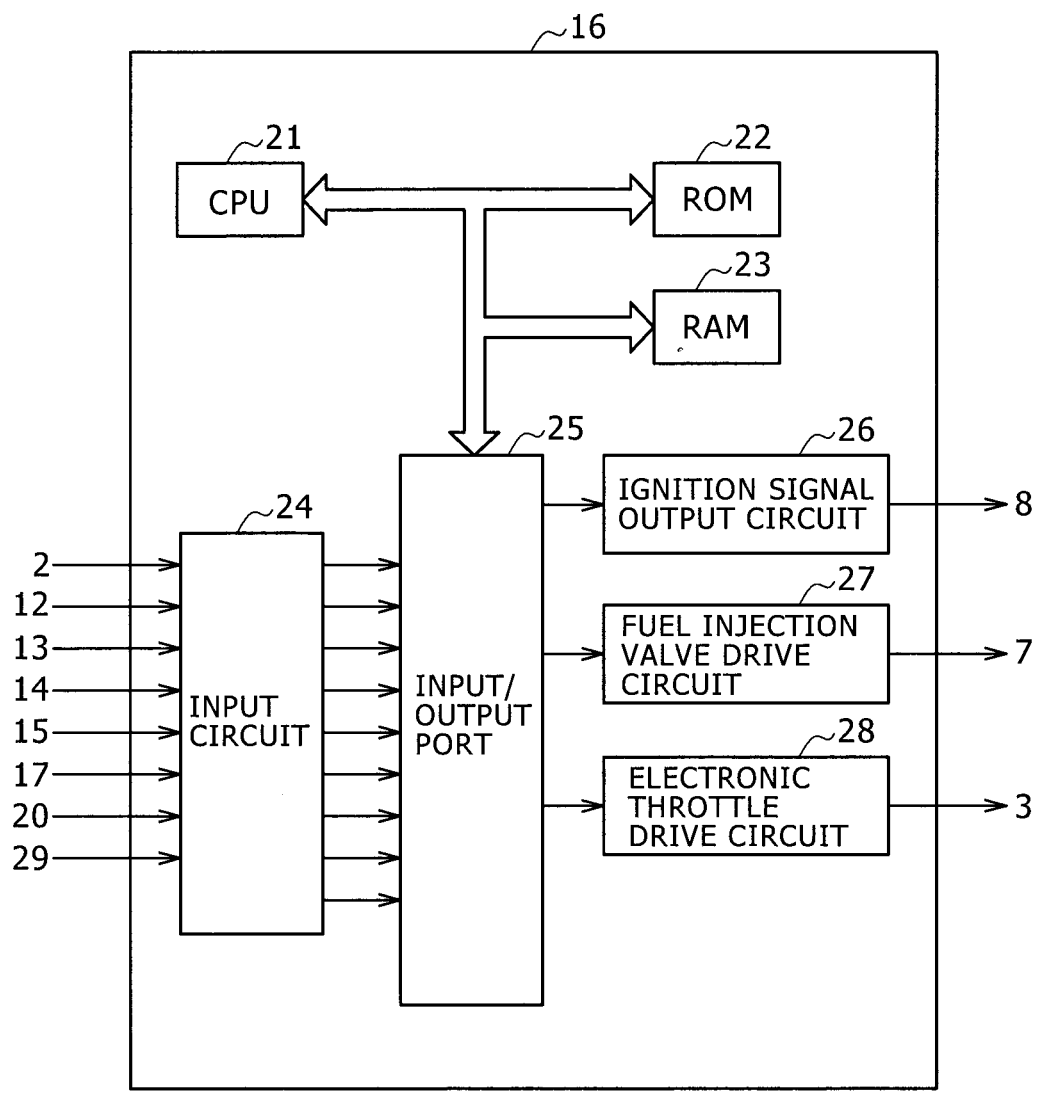
FIG. 19 is a drawing expressing the inside of a control unit in examples 1-3.

FIG. 19 shows the inside of the control unit 16. Respective sensor output values of the air flow sensor 2, the catalyst upstream air fuel ratio sensor 12, the accelerator opening sensor 13, the water temperature sensor 14, the engine speed sensor 15, the throttle valve opening sensor 17, the catalyst downstream $O_2$ sensor 20, the intake temperature sensor 29, and a speed sensor 30 are inputted into the control unit 16, are subjected to a signal processing such as noise removal and the like in an input circuit 24, and are transmitted thereafter to an input/output port 25. The value at the input port is stored in a RAM 23, and is subjected to calculation processing inside a CPU 21. A control program describing contents of calculation processes is written in a ROM 22 in advance. Values calculated according to the control program and expressing respective actuator working amounts are stored in the RAM 23 and are thereafter transmitted to the input/output port 25. A work signal of the ignition plug is set with an ON•OFF signal that turns ON when a primary side coil inside an ignition output circuit is excited and turns OFF when not excited. The ignition timing is time when ON turns to OFF. A signal for the ignition plug set in the output port is amplified to a sufficient energy level required for combustion in an ignition output circuit 26, and is supplied to the ignition plug. Also a drive signal of the fuel injection valve is set with an ON•OFF signal that turns ON when the valve opens and turns OFF when the valve closes, is amplified to an energy level sufficient to open the fuel injection valve by a fuel injection valve drive circuit 27, and is transmitted to the fuel injection valve 7. A drive signal achieving the target opening of the electronic throttle 3 is transmitted to the electronic throttle 3 through an electronic throttle drive circuit 28.

Figure 20:
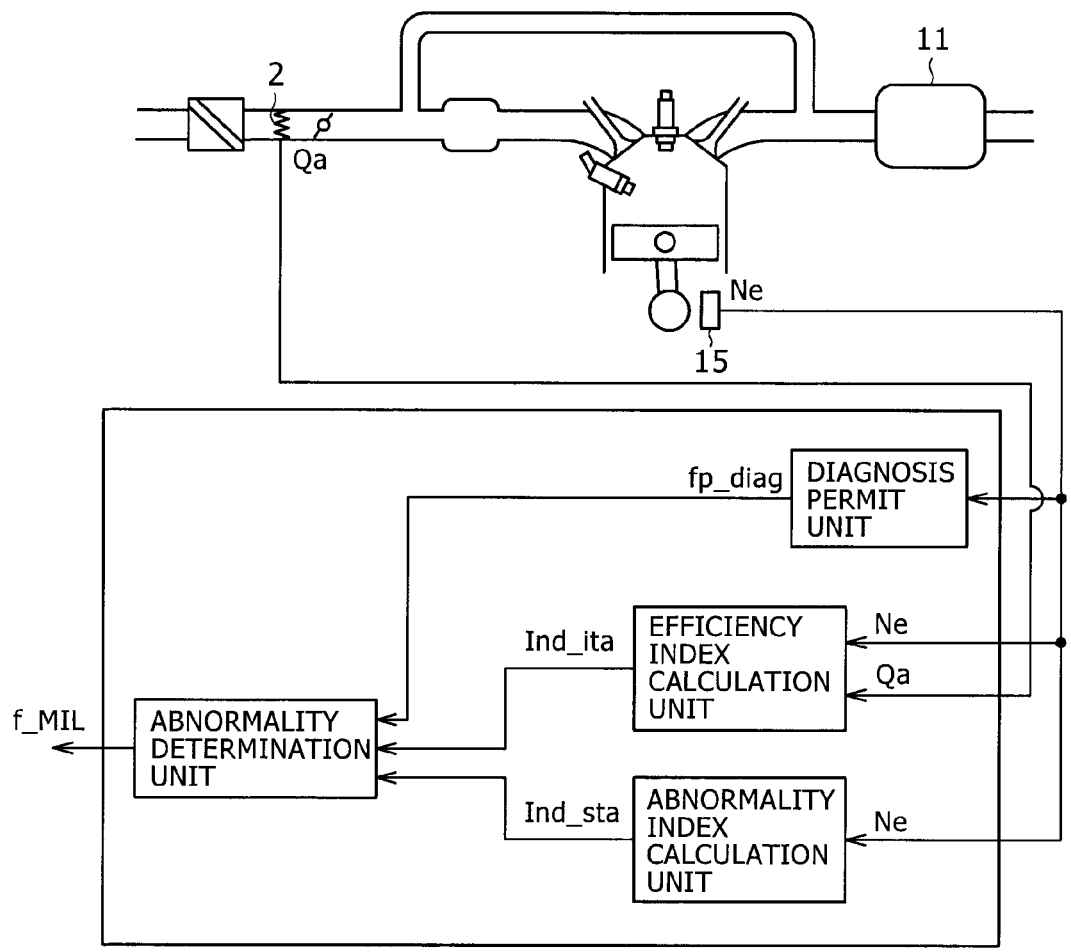
FIG. 20 is a block diagram expressing the total control in example 1.

Below, the control program written in the ROM 22 will be described. FIG. 20 is a block diagram expressing the total control, and is formed of calculation units described below.
Diagnosis permit unit (FIG. 21)
Efficiency index calculation unit (FIG. 22)
Instability index calculation unit (FIG. 23)
Abnormality determination unit (FIG. 24)

A flag (fp_diag) that permits diagnosis is calculated by "the diagnosis permit unit". An engine efficiency index (Ind_ita) that is a ratio of an engine speed (Ne) and a suction air quantity (Qa) is calculated by "the efficiency index calculation unit". An instability index (Ind_sta) that is a variation degree of the angular acceleration expressing instability of combustion is calculated by "the instability index calculation unit". By "the abnormality determination unit", whether or not the HC discharged quantity at the time of start is a predetermined value or less is determined from both values of the efficiency index (Ind_ita) and the instability index (Ind_sta), and, when the HC discharged quantity at the time of start is a predetermined value or more, an abnormality flag (f_MIL) is made 1. Below, the detail of respective calculation units will be described.

Figure 21:
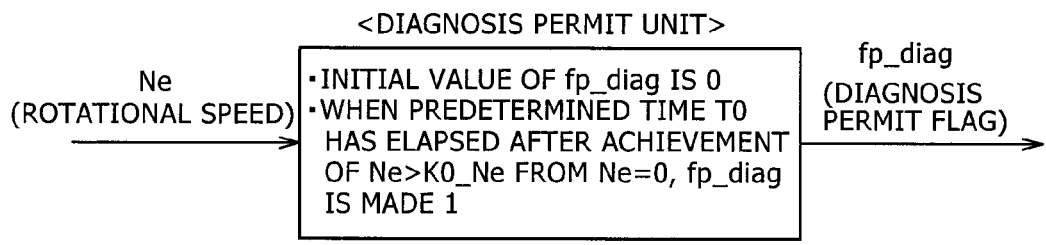
FIG. 21 is a block diagram of a diagnosis permit unit in examples 1, 3.

<Diagnosis Permit Unit (FIG. 21)>
By the present calculation unit, a diagnosis permit flag (fp_diag) is calculated which is specifically shown in FIG. 21. The initial value of fp_diag is made 0. When a predetermined time T0 has elapsed after the rotational speed (Ne) changes from 0 to Ne>K0_Ne, fp_diag is made 1. That is, when a predetermined time has elapsed after a state of engine stop and start of the engine, diagnosis is permitted.

Figure 22:
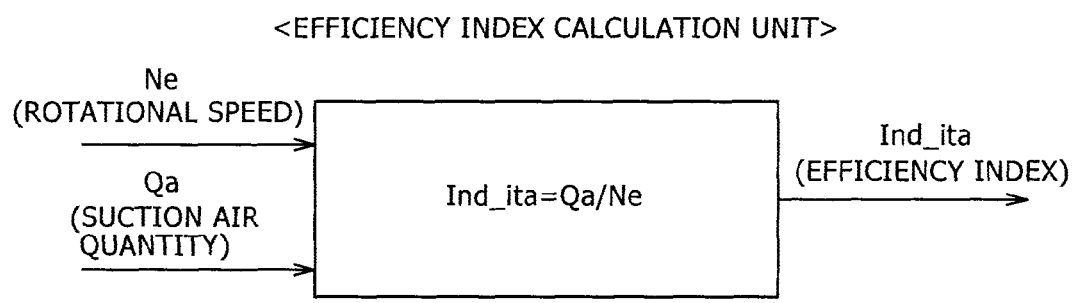
FIG. 22 is a block diagram of an efficiency index calculation unit in examples 1-3.

<Efficiency Index Calculation Unit (FIG. 22)>
By the present calculation unit, the efficiency index (Ind_ita) is calculated which is specifically shown in FIG. 22. A ratio of the engine speed (Ne) and the suction air quantity (Qa) is made the engine efficiency index (Ind_ita).

Figure 23:
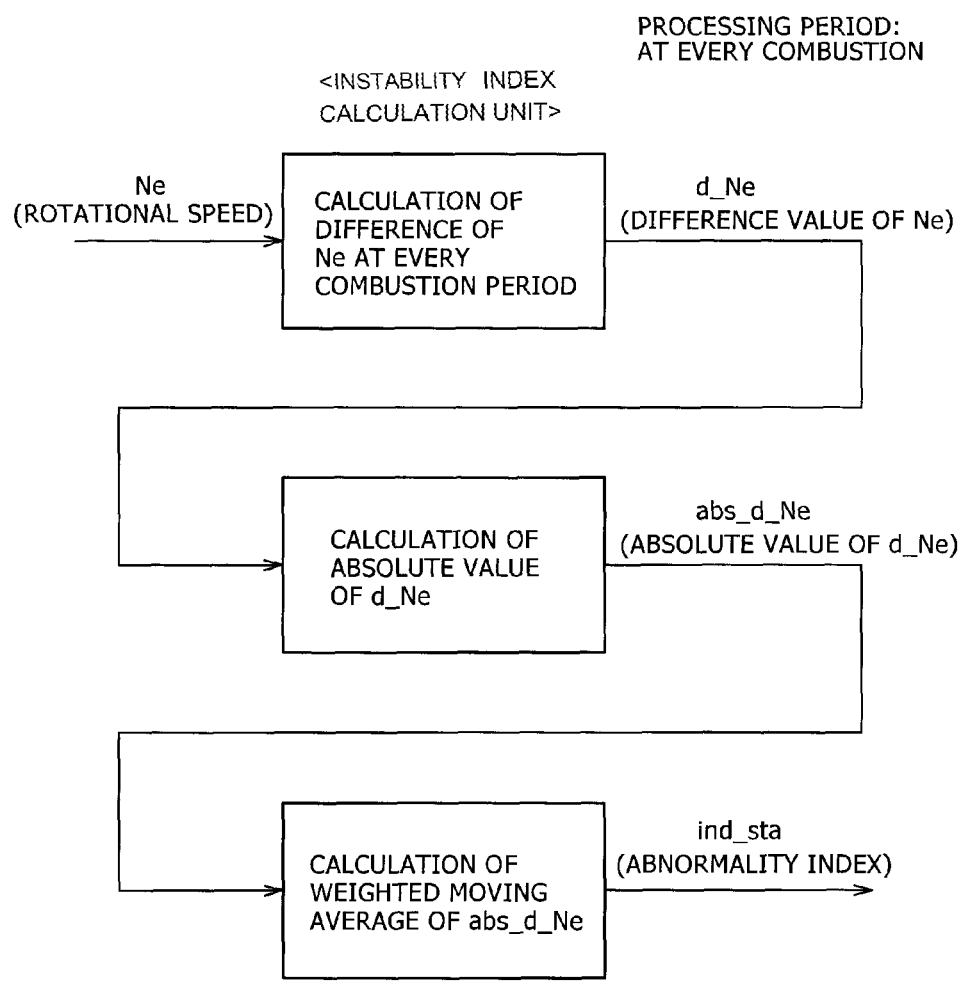
FIG. 23 is a block diagram of an instability index calculation unit in examples 1-3.
Figure 24:
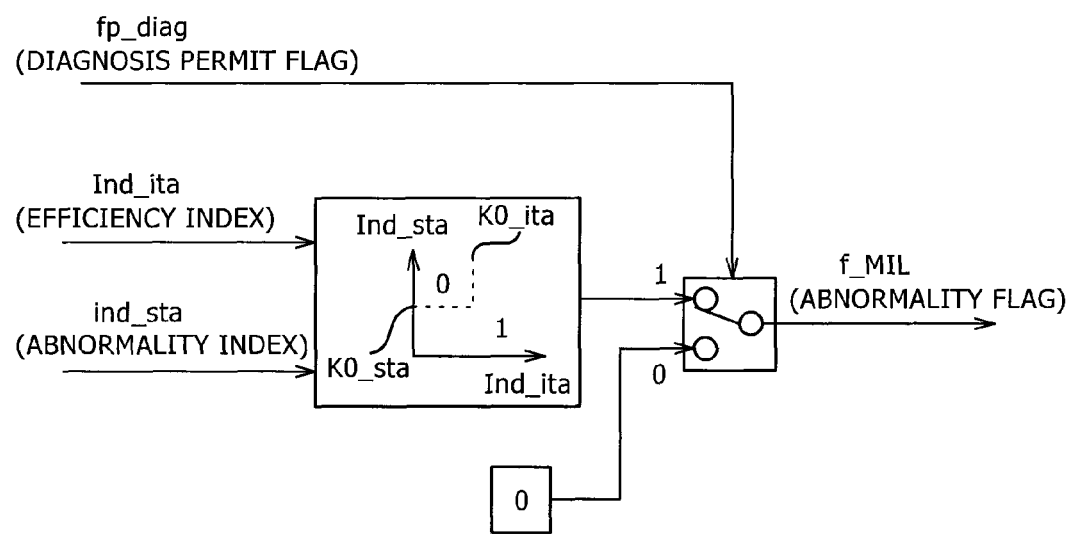
FIG. 24 is a block diagram of an abnormality determination unit in examples 1, 3.

<Instability Index Calculation Unit (FIG. 23)>
By the present calculation unit, the instability index (Ind_sta) is calculated which is specifically shown in FIG. 23.
Difference of the engine speed (Ne) is calculated for every combustion period and is made d_Ne.
An absolute value of d_Ne is calculated and is made abs_d_Ne.
A weighted moving average value of abs_d_Ne is calculated and is made the instability index (Ind_ita).
A weighted index of a weighted moving averaging processing is determined according to the responsiveness required for diagnosis.

<Abnormality Determination Unit (FIG. 24)>
By the present calculation unit, the abnormality flag (f_MIL) is calculated which is specifically shown in FIG. 24.
When the diagnosis permit flag (fp_diag) is 0, the abnormality flag (f_MIL) is made 0.
When the diagnosis permit flag (fp_diag) is 1, and when "the efficiency index (Ind_ita) is K0_ita or less" and "the instability index (Ind_sta) is K0_sta or more", f_MIL is made 0. Otherwise, f_MIL is made 1.

Figure 1:
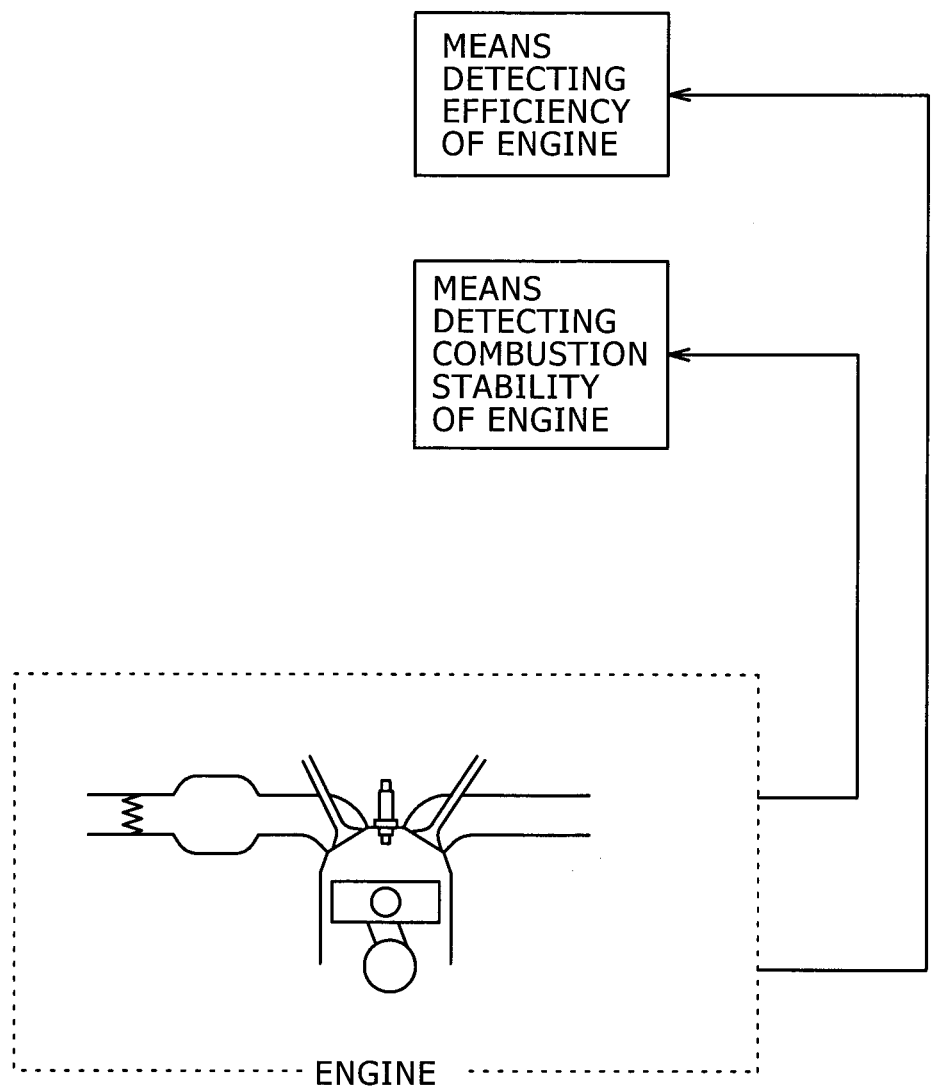
FIG. 1 is a conceptual drawing showing a control device of an engine described in claim 1.
Figure 2:
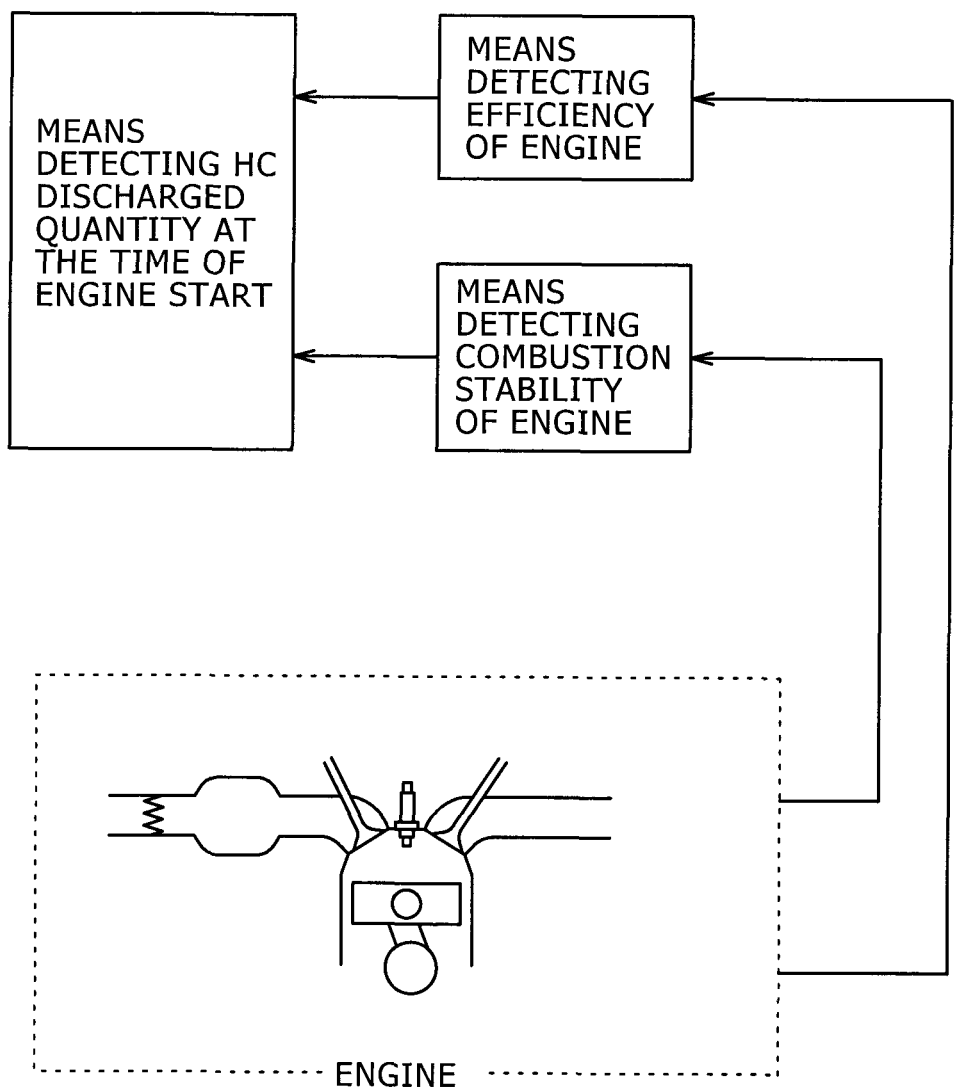
FIG. 2 is a conceptual drawing showing a control device of an engine described in claim 2.
Figure 3:
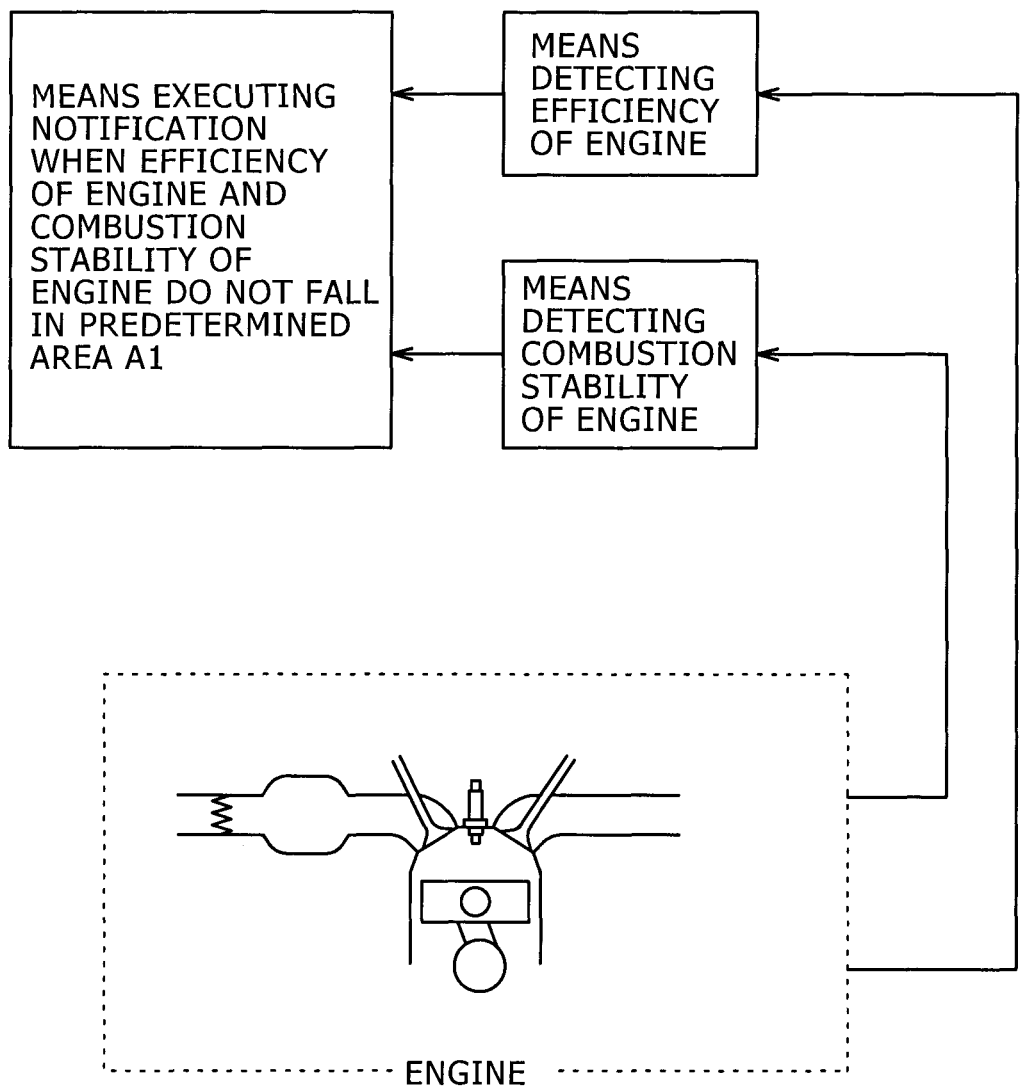
FIG. 3 is a conceptual drawing showing a control device of an engine described in claim 3.
Figure 4:
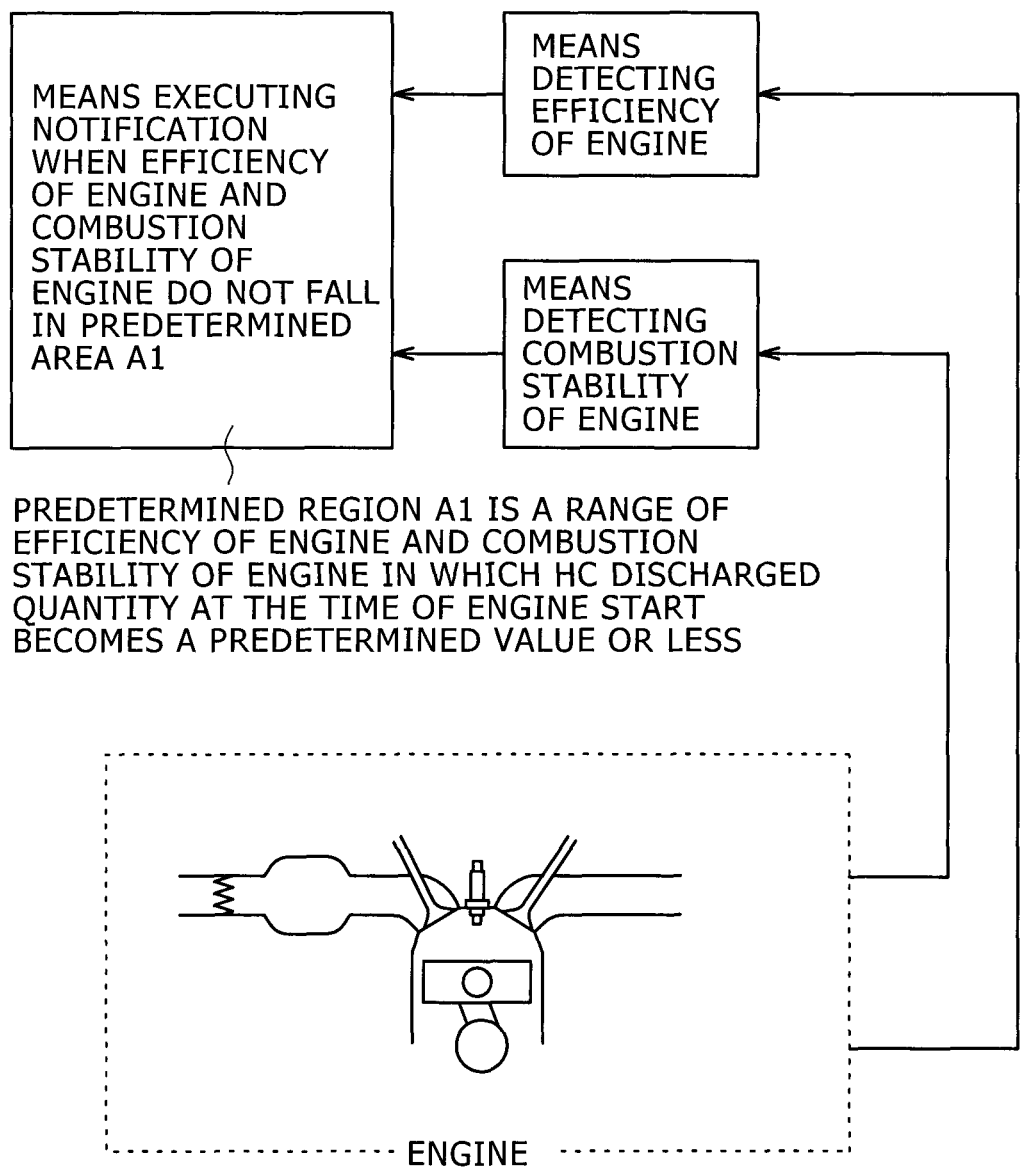
FIG. 4 is a conceptual drawing showing a control device of an engine described in claim 4.
Figure 5:
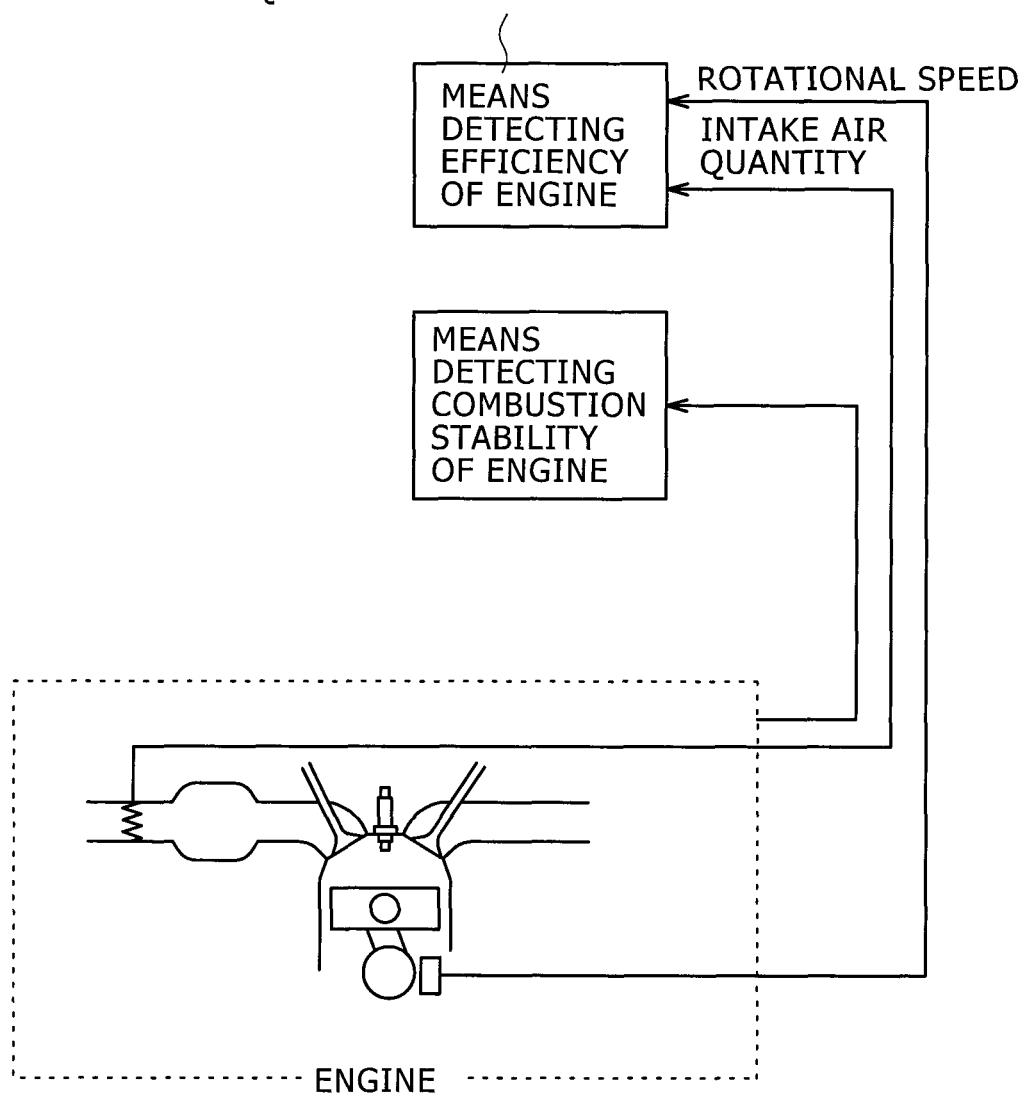
FIG. 5 is a conceptual drawing showing a control device of an engine described in claim 5.
Figure 6:
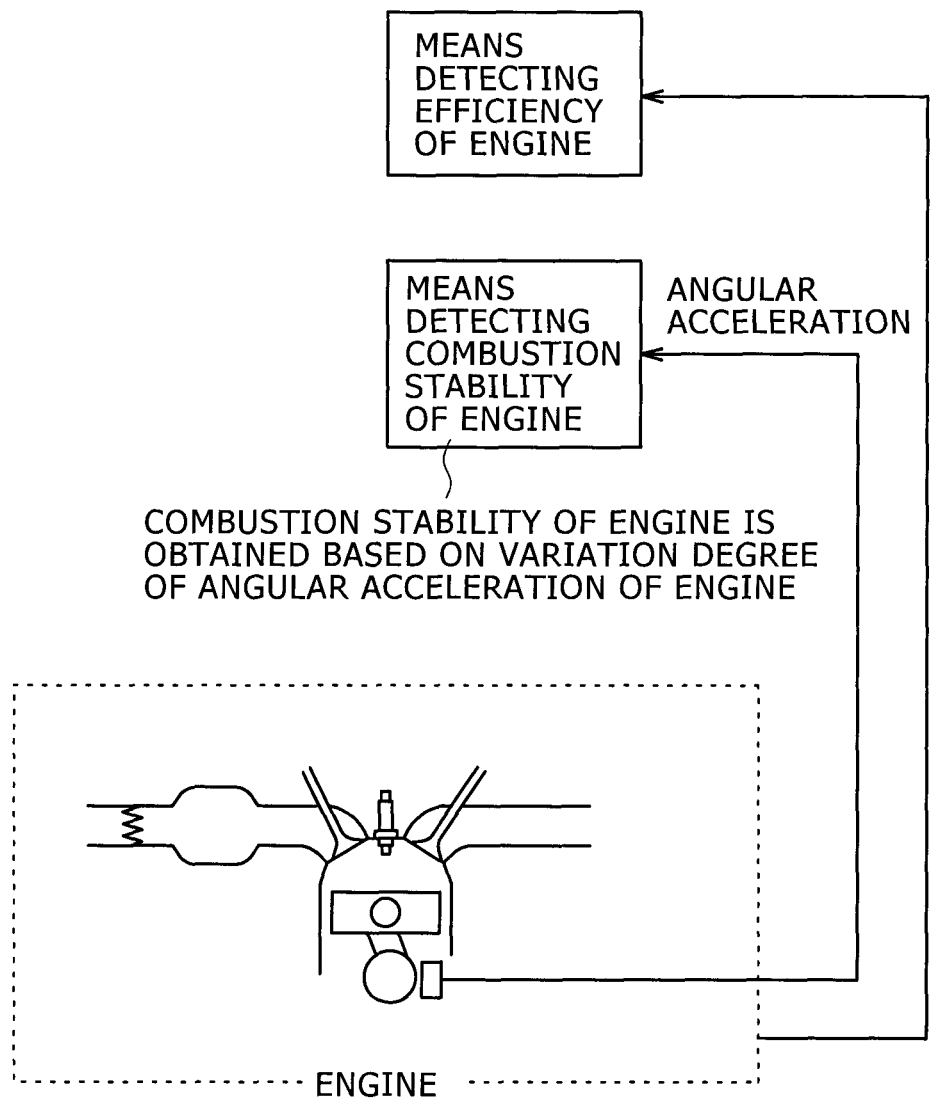
FIG. 6 is a conceptual drawing showing a control device of an engine described in claim 6.
Figure 7:
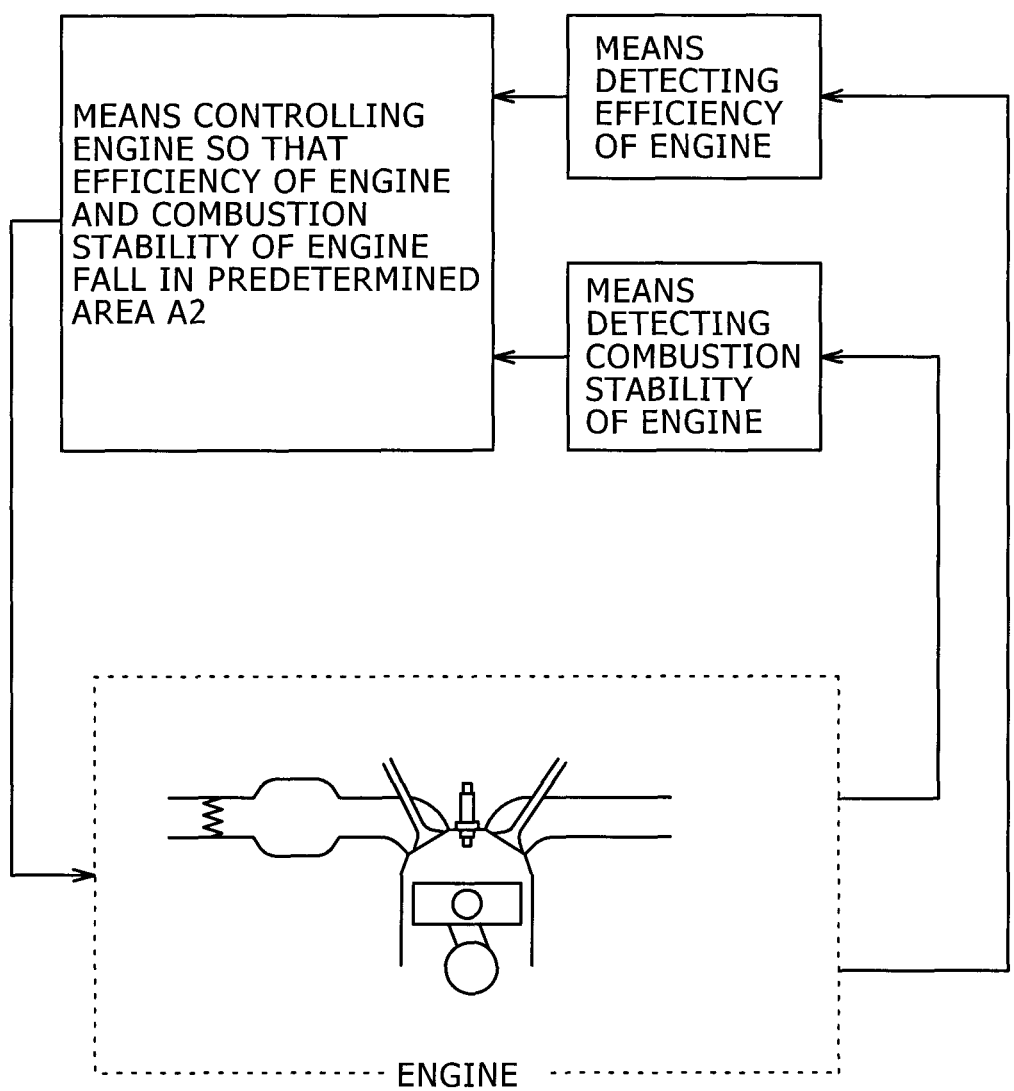
FIG. 7 is a conceptual drawing showing a control device of an engine described in claim 7.
Figure 8:
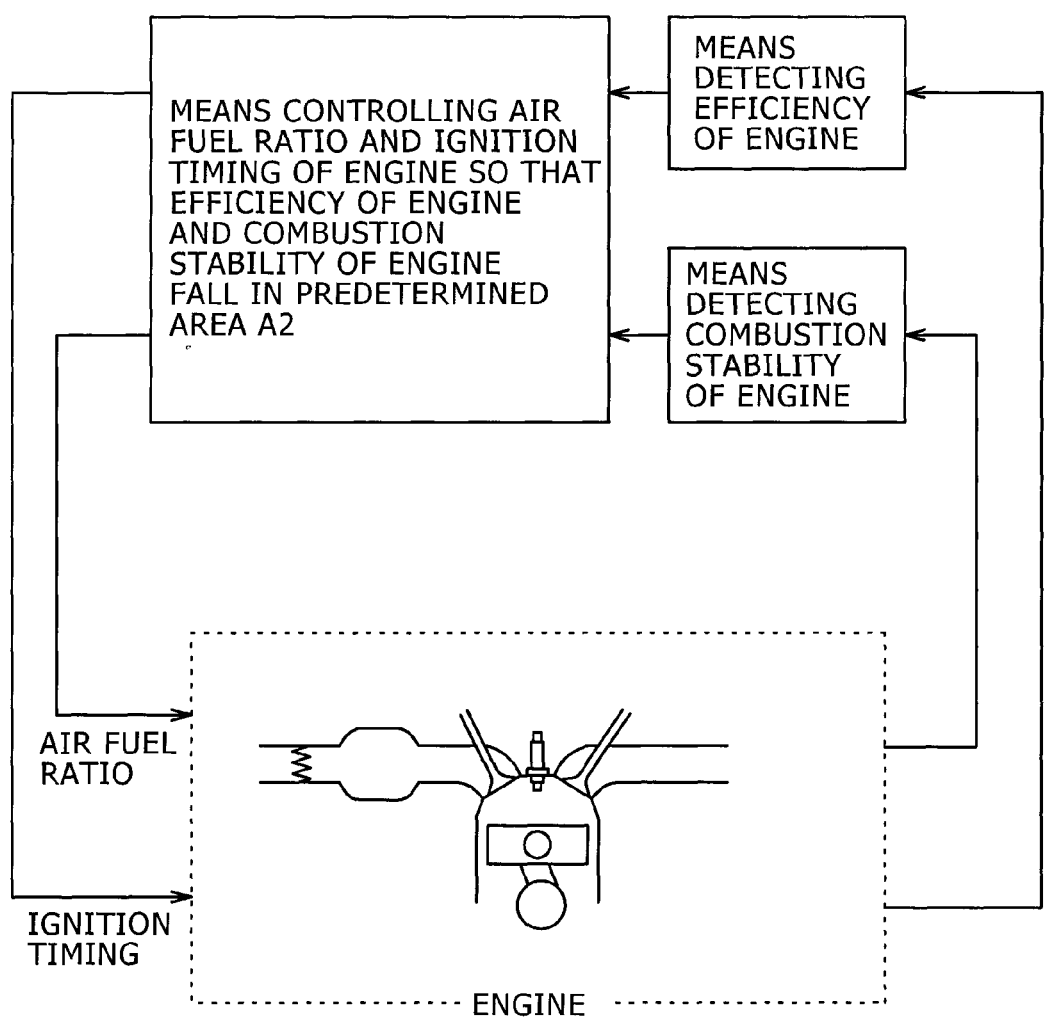
FIG. 8 is a conceptual drawing showing a control device of an engine described in claim 8.
Figure 9:
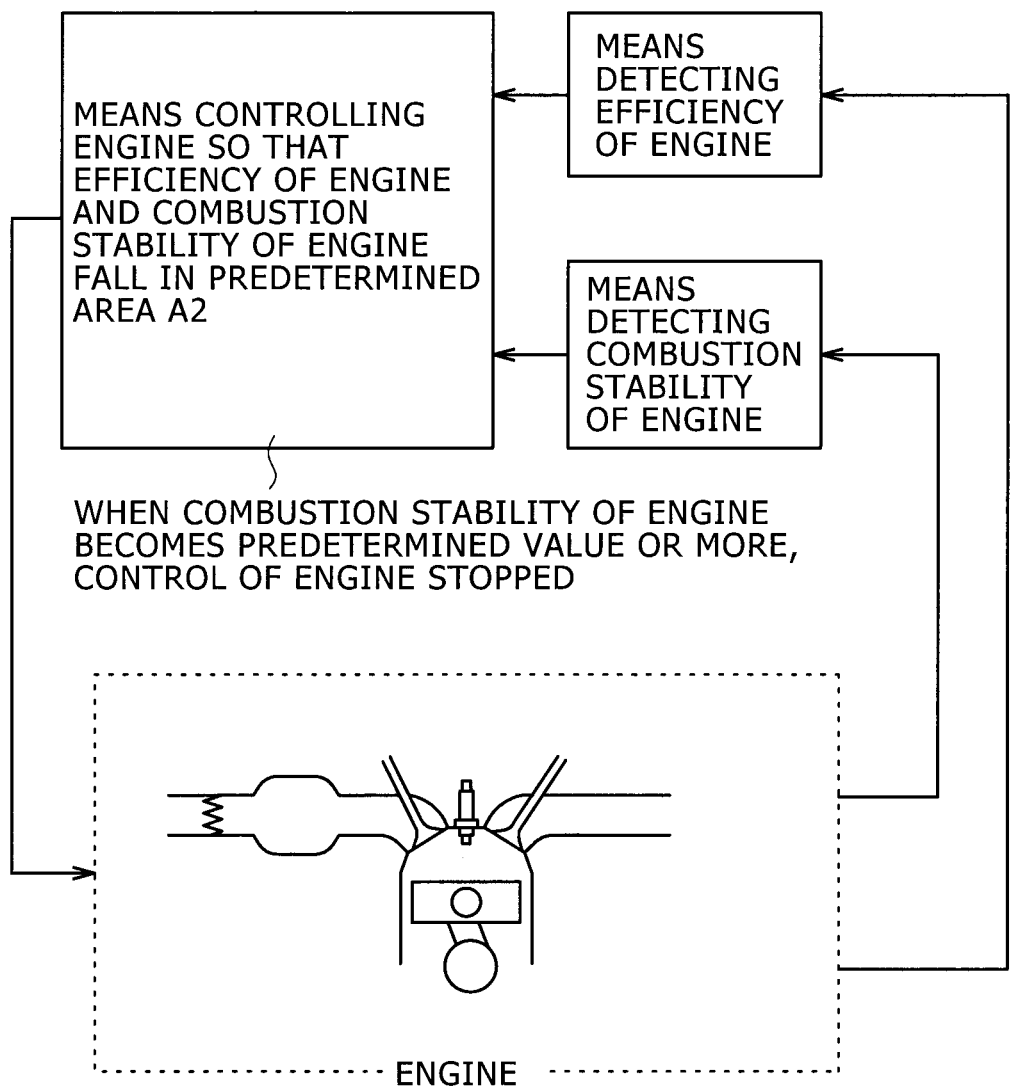
FIG. 9 is a conceptual drawing showing a control device of an engine described in claim 9.
Figure 10:
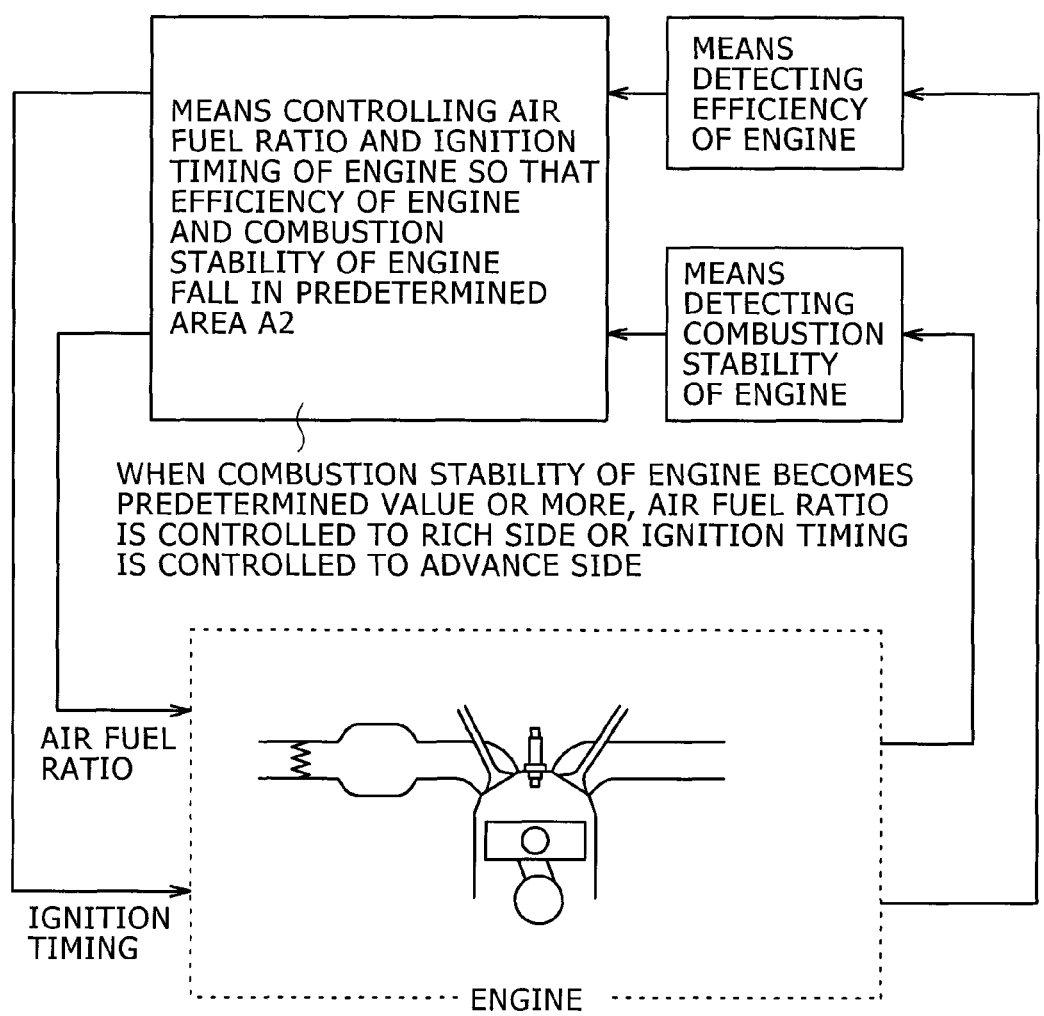
FIG. 10 is a conceptual drawing showing a control device of an engine described in claim 10.
Figure 11:
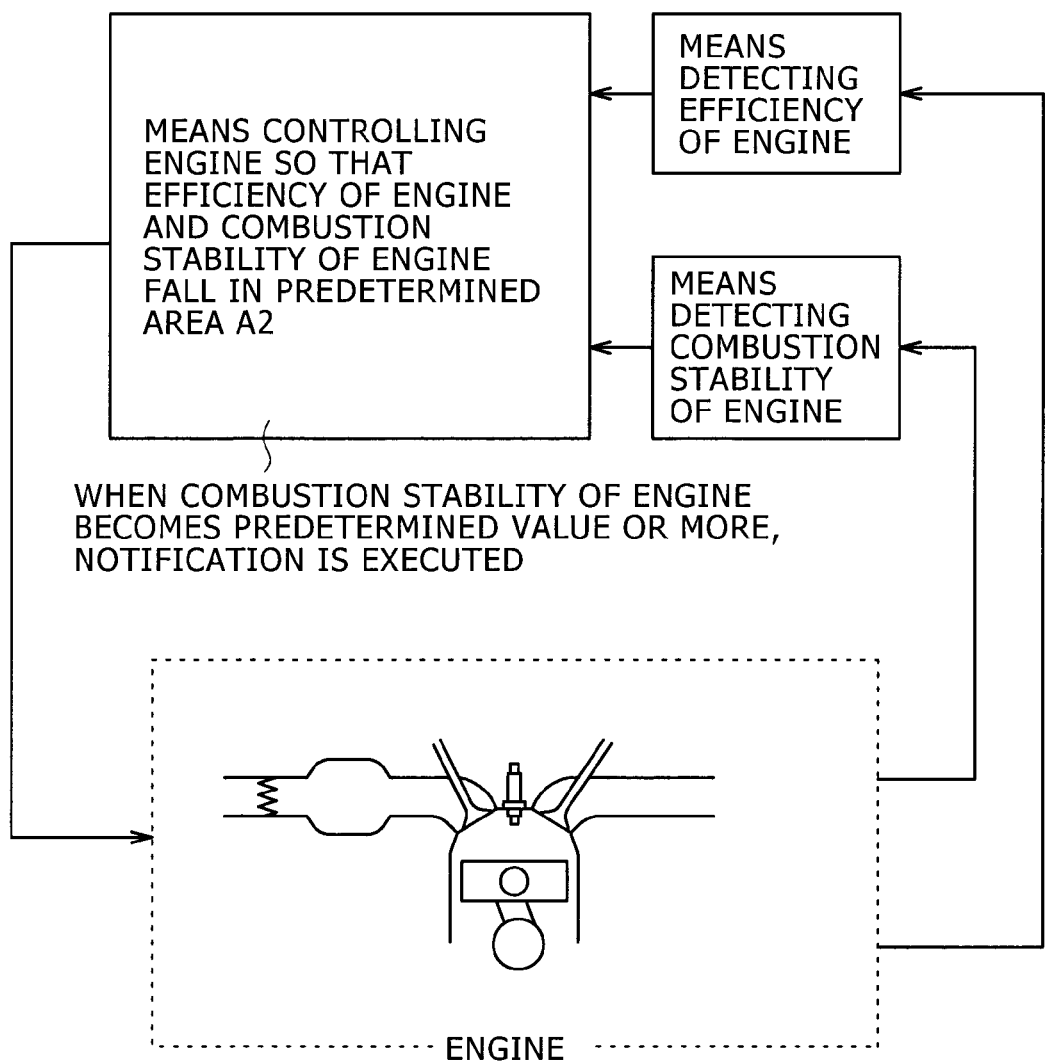
FIG. 11 is a conceptual drawing showing a control device of an engine described in claim 11.
Figure 12:
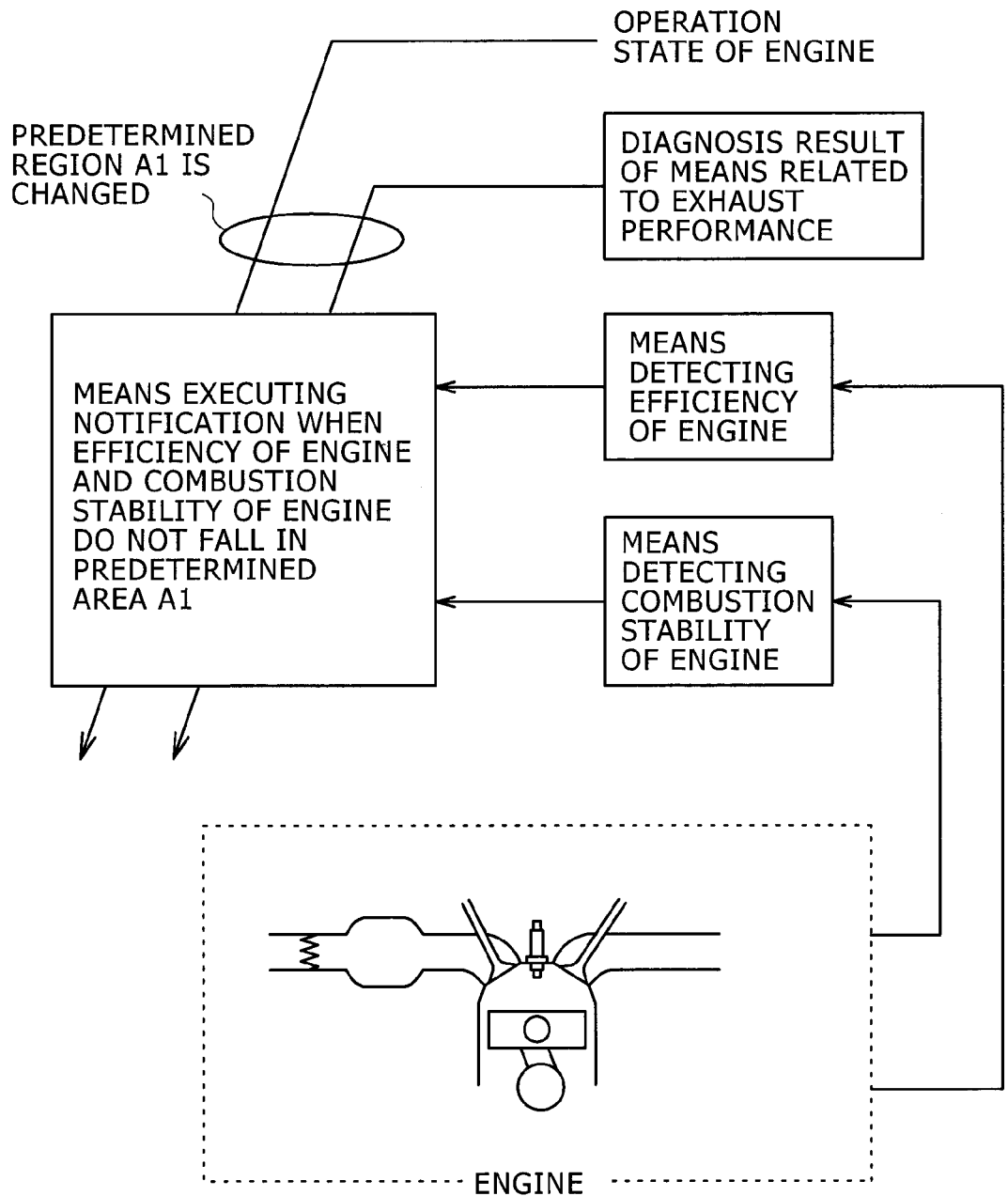
FIG. 12 is a conceptual drawing showing a control device of an engine described in claim 12.
Figure 13:
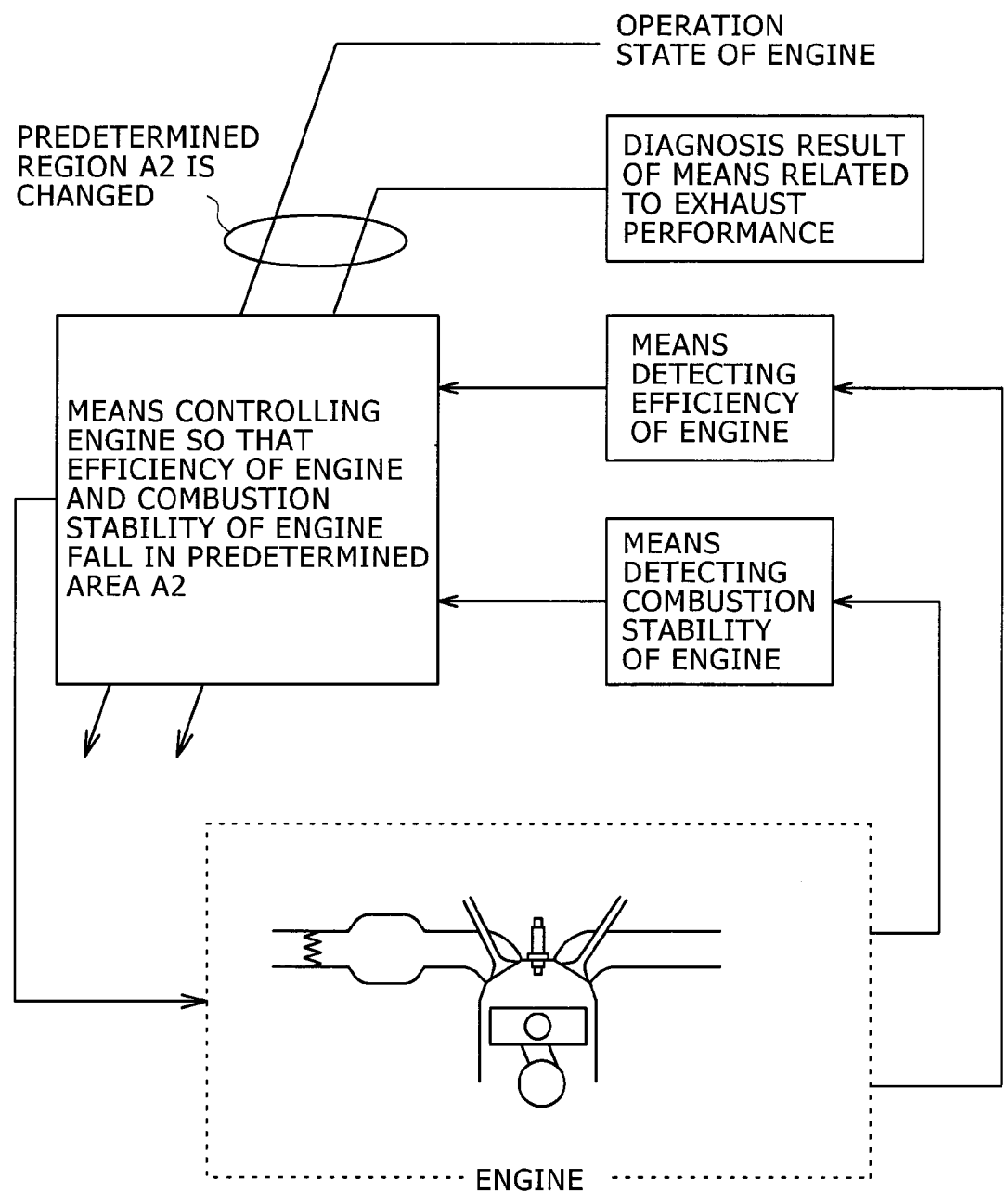
FIG. 13 is a conceptual drawing showing a control device of an engine described in claim 13.
Figure 14:
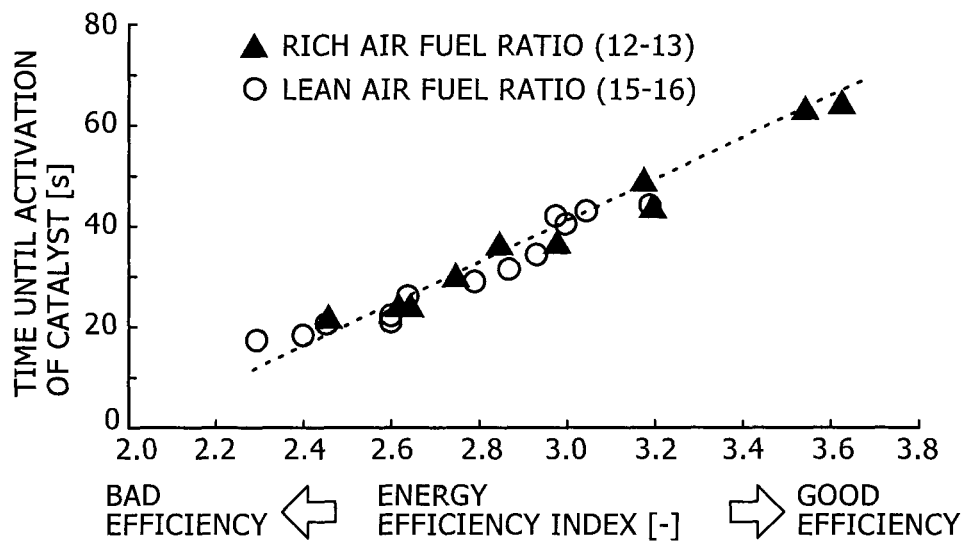
FIG. 14 is a drawing showing the relation between the efficiency of the engine and the time until activation of the catalyst.
Figure 15:
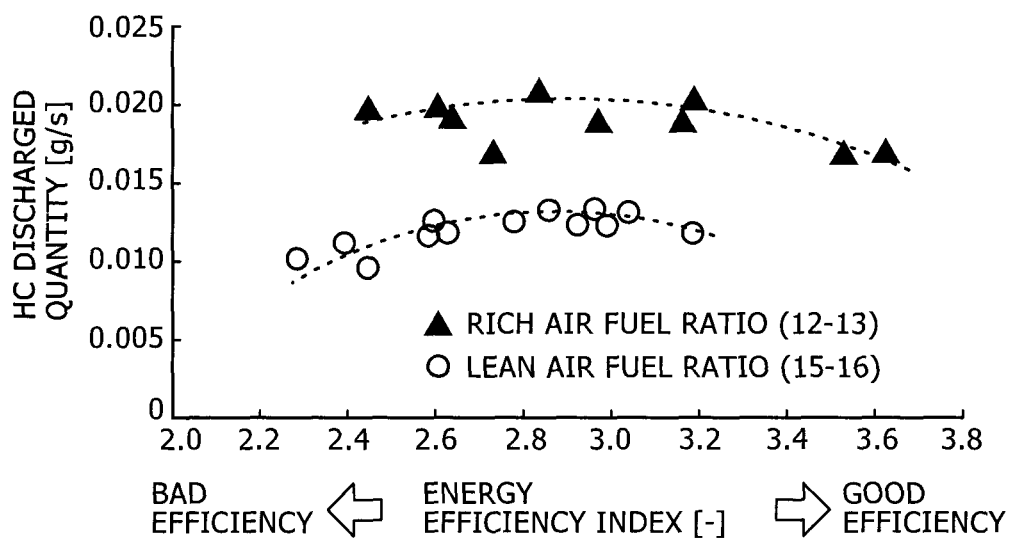
FIG. 15 is a drawing showing the relation between the efficiency of the engine and the HC discharged quantity.
Figure 16:
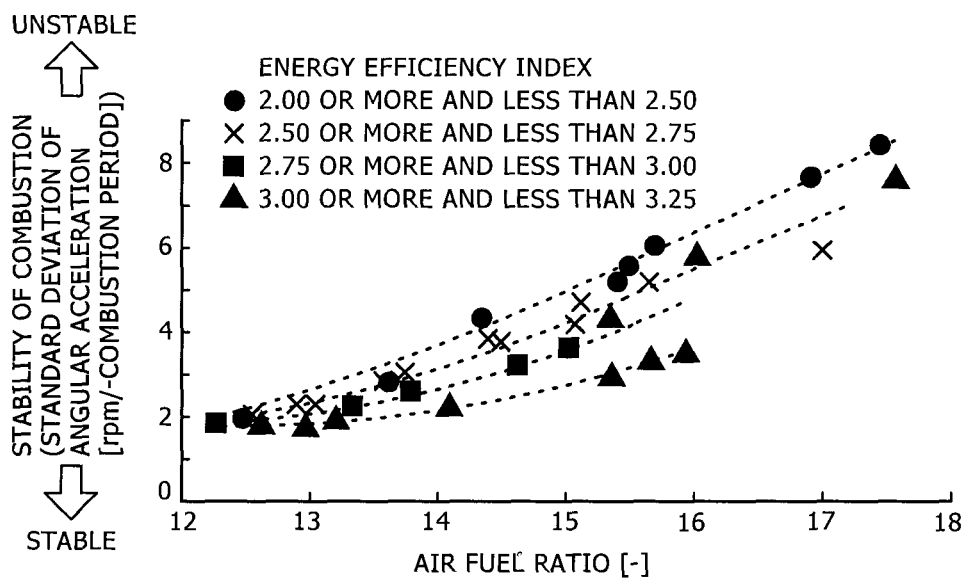
FIG. 16 is a drawing showing the relation between the air fuel ratio and the stability of combustion.
Figure 17:
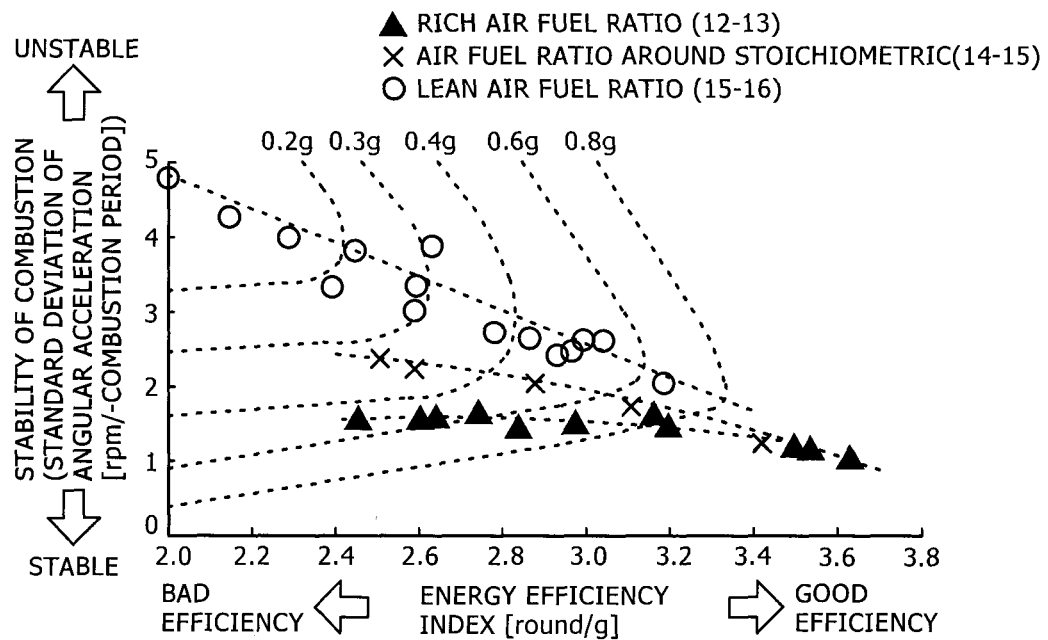
FIG. 17 is a drawing showing the relation of the efficiency of the engine, the stability of combustion and the HC discharged quantity until activation of the catalyst.

As shown in FIG. 17, K0_ita and K0_sta are determined from the efficiency index and the instability index corresponding to the HC discharged quantity at the time of start that is made an abnormal level. Although an equal HC discharged quantity line is a curved line in FIG. 17, in order to facilitate mounting, it may be approximated by a straight line as the present example. According to required accuracy, it may be brought close to a curved line. Also, it may be changed based on the operation condition of the engine. It may be changed also based on a change (deterioration) of the light-off performance of the catalyst. More specifically, K0_ita is increased or K0_sta is reduced according to deterioration of the light-off performance of the catalyst. It is also possible to change both the parameters.

Example 2

In example 1, the HC discharged quantity at the time of start was diagnosed from the efficiency of the engine and the stability of the engine. In example 2, the engine is controlled so that the HC discharged quantity at the time of start becomes a predetermined value from the efficiency of the engine and the stability of the engine.

Figure 25:
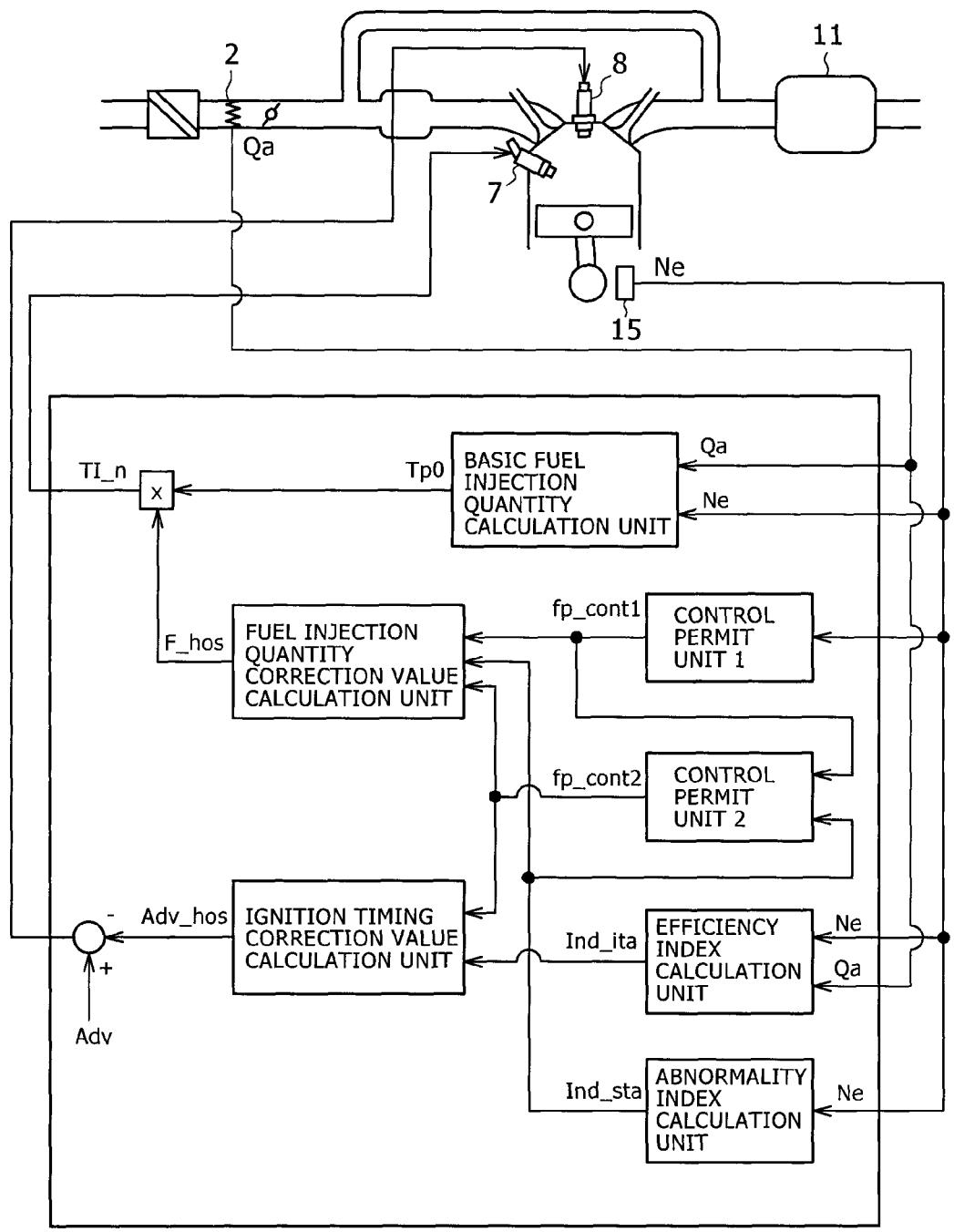
FIG. 25 is a block diagram expressing the total control in example 2.

FIG. 18 is a system drawing showing the present example and is similar to that of example 1, and therefore detailed description thereof will be omitted. FIG. 19 shows the inside of the control unit 16 and is similar to that of example 1, and therefore detailed description thereof will be omitted also. Below, a control program written in the ROM 22 in FIG. 19 will be described. FIG. 25 is a block diagram expressing the total control, and is formed of calculation units described below.
Basic fuel injection quantity calculation unit (FIG. 26)
Control permit unit 1 (FIG. 27)
Instability index calculation unit (FIG. 23)
Basic fuel injection quantity correction value calculation unit (FIG. 28)
Control permit unit 2 (FIG. 29)
Efficiency index calculation unit (FIG. 22)

Figure 30:
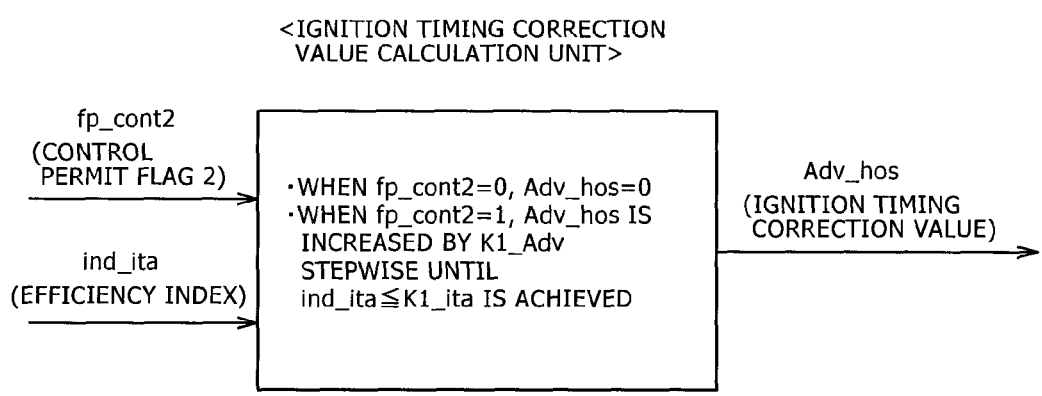
FIG. 30 is a block diagram of an ignition timing correction value calculation unit in example 2.

Ignition timing correction value calculation unit (FIG. 30)

By "the basic fuel injection quantity calculation unit", a basic fuel injection quantity Tp0 is calculated. By "the control permit unit 1", a flag (fp_cont1) is calculated which permits control for making the air fuel ratio lean based on the instability index (Ind_sta) after start. By "the instability index calculation unit", the instability index (Ind_sta) is calculated which is a variation degree of the angular acceleration meaning instability of combustion. By "the basic fuel injection quantity correction value calculation unit", a basic fuel injection quantity correction value (F_hos) for making the air fuel ratio lean is calculated. By "the control permit unit 2", a flag (fp_cont2) is calculated which permits control for retarding the ignition timing based on the efficiency index (Ind_ita) after the air fuel ratio is made lean. By "the efficiency index calculation unit", the engine efficiency index (Ind_ita) is calculated which is a ratio of the engine speed (Ne) and the suction air quantity (Qa). By "the ignition timing correction value calculation unit", an ignition timing correction value (Adv_hos) retarding the ignition timing is calculated. Below, the detail of respective calculation units will be described.

<Basic Fuel Injection Quantity Calculation Unit (FIG. 26)>

By the present calculation unit, the basic fuel injection quantity (Tp0) is calculated. More specifically, it is calculated by an expression shown in FIG. 26. Here, Cyl expresses the cylinder number. K0 is determined based on the specification of the injector (relation between the fuel injection pulse width and the fuel injection quantity).

<Control Permit Unit 1 (FIG. 27)>

Figure 27:
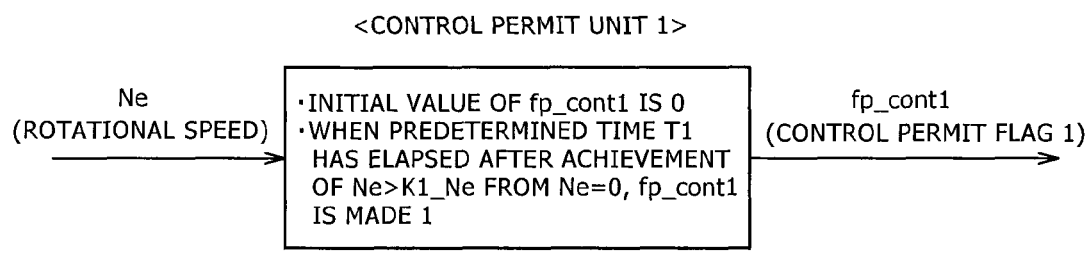
FIG. 27 is a block diagram of a control permit unit 1 in examples 2-3.

By the present calculation unit, the control permit flag (fp_cont1) is calculated which is specifically shown in FIG. 27. The initial value of fp_cont1 is made 0. When a predetermined time T1 has elapsed after the rotational speed (Ne) becomes Ne>K1_Ne from 0, fp_cont1 is made 1. That is, when a predetermined time has elapsed after a state of engine stop and start of the engine, leaning of the air fuel ratio is started.

<Instability Index Calculation Unit (FIG. 23)>

By the present calculation unit, the instability index (Ind_sta) is calculated which is specifically shown in FIG. 23, however, because it is same with that of example 1, detail description thereof will be omitted.

Figure 28:
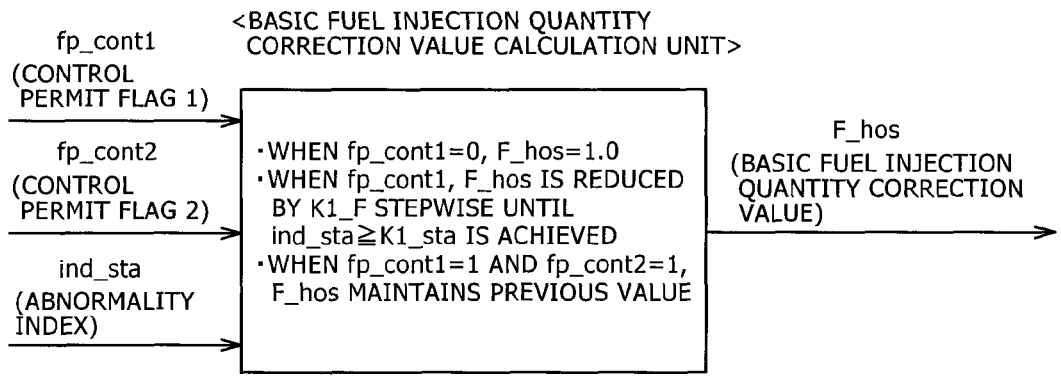
FIG. 28 is a block diagram of a basic fuel injection quantity correction value calculation unit in examples 2-3.

<Basic Fuel Injection Quantity Correction Value Calculation Unit (FIG. 28).

By the present calculation unit, the basic fuel injection quantity correction value (F_hos) is calculated which is specifically shown in FIG. 28.

When fp_cont1=0, F_hos is made 1.0.
When fp_cont1=1, F_hos is reduced by K1_F stepwise until ind_sta≥K1_sta is achieved.
When fp_cont1=1 and fp_cont2=1, F_hos maintains a previous value.

K1_sta is made an instability index value equivalent to a target air fuel ratio. Also, it may be changed based on the operation condition of the engine. It may be changed also based on a change (deterioration) of the light-off performance of the catalyst. More specifically, K1_sta is increased according to deterioration of the light-off performance of the catalyst.

K1_F is a value that determines a leaning speed, and is determined taking responsiveness of the engine and the like also into account.

<Control Permit Unit 2 (FIG. 29)>

Figure 29:
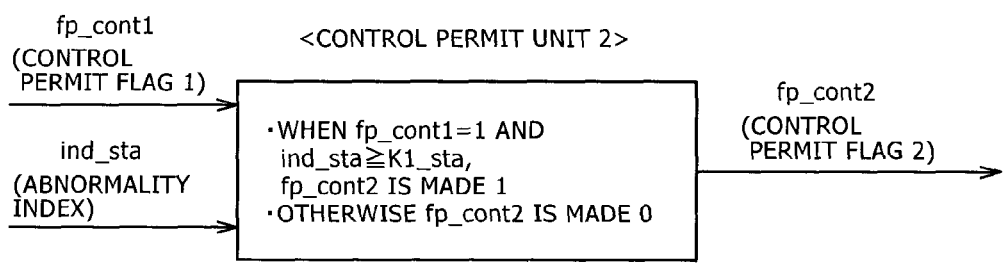
FIG. 29 is a block diagram of a control permit unit 2 in examples 2-3.

By the present calculation unit, the control permit flag 2 (fp_cont2) is calculated which is specifically shown in FIG. 29.

When fp_cont1=0 and ind_sta≥K1_sta, fp_cont2 is made 1. Otherwise, fp_cont2 is made 0.

As described above, K1_sta is made the instability index value equivalent to the target air fuel ratio.

<Instability Index Calculation Unit (FIG. 22)>

By the present calculation unit, the efficiency index (Ind_ita) is calculated which is specifically shown in FIG. 22, however, because it is same with that of example 1, detail description thereof will be omitted.

<Ignition Timing Correction Value Calculation Unit (FIG. 30)>

By the present calculation unit, then ignition timing correction value (Adv_hos) is calculated which is specifically shown in FIG. 30.

When fp_cont2=0, Adv_hos is made 0.
When fp_cont2=1, Adv_hos is increased stepwise by K1_Adv until ind_ita≥K1_ita is achieved.

As shown in FIG. 17, K1_ita is made an energy efficiency index corresponding to a target HC discharged quantity. Further, it may be changed also based on the operation condition of the engine. It may be changed also based on a change (deterioration) of the light-off performance of the catalyst. More specifically, K1_ita is reduced according to deterioration of the light-off performance of the catalyst.

Example 3

In example 2, the engine was controlled so that the HC discharged quantity at the time of start became a predetermined value from the efficiency of the engine and the stability of the engine. In example 3, with respect to example 2, when the ignition timing is retarded, if the stability of the engine deteriorates to a predetermined value or more, even if the efficiency of the engine has not reached a target value, retarding of the ignition timing is stopped, and the ignition timing is advanced so as to secure stability. Further, diagnosis of the HC discharged quantity at the time of start is also executed in parallel.

Figure 31:
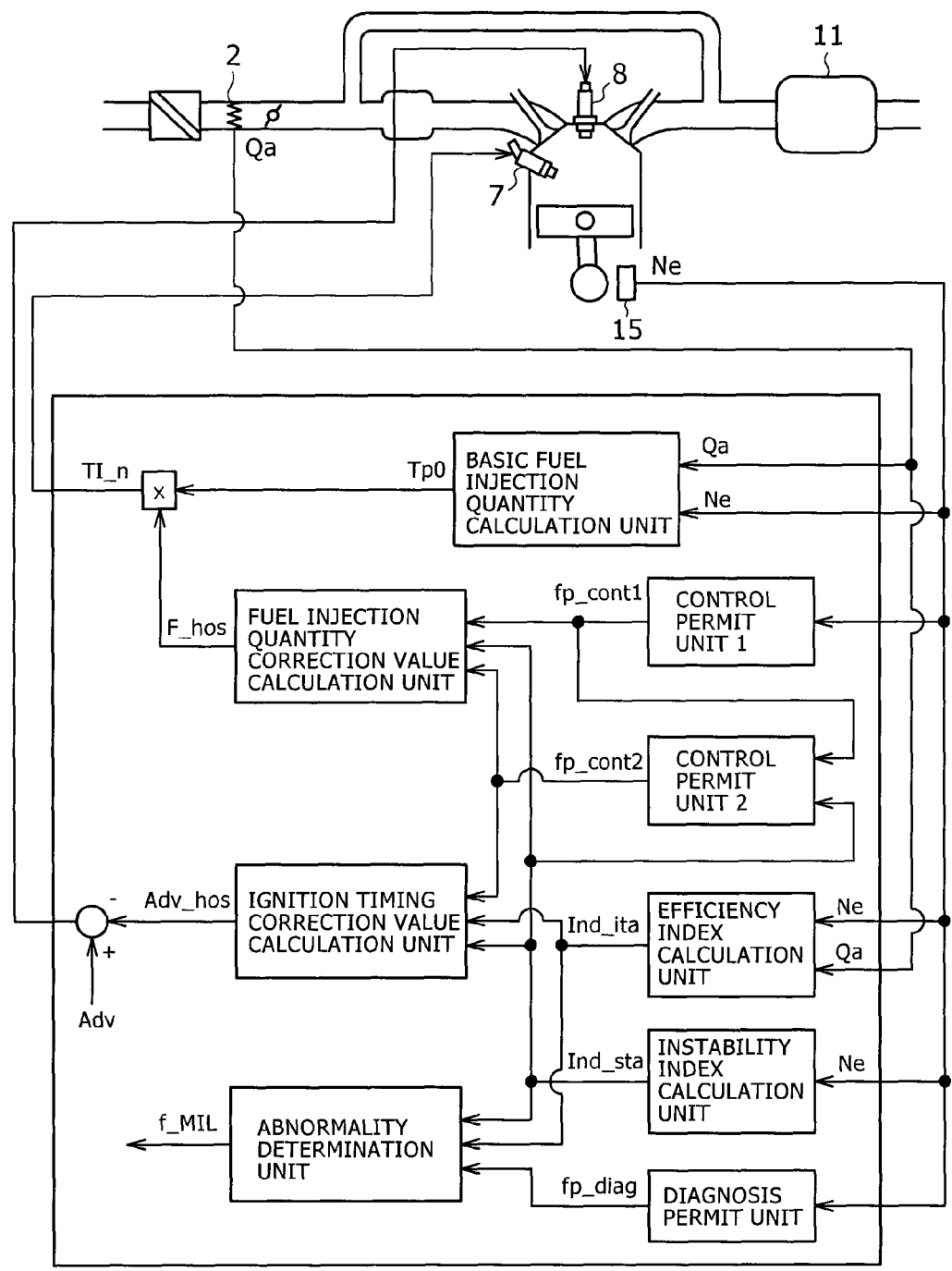
FIG. 31 is a block diagram expressing the total control in example 3.

FIG. 18 is a system drawing showing the present example and is similar to that of example 1, and therefore detailed description thereof will be omitted. FIG. 19 shows the inside of the control unit 16 and is similar to example 1, and therefore detailed description thereof will be also omitted. Below, a control program written in the ROM 22 in FIG. 19 will be described. FIG. 31 is a block diagram expressing the total control, and is formed of calculation units described below.

Basic fuel injection quantity calculation unit (FIG. 26)
Control permit unit 1 (FIG. 27)
Instability index calculation unit (FIG. 23)
Basic fuel injection quantity correction value calculation unit (FIG. 28)
Control permit unit 2 (FIG. 29)
Efficiency index calculation unit (FIG. 22)
Ignition timing correction value calculation unit (FIG. 32)
Diagnosis permit unit (FIG. 21)
Abnormality determination unit (FIG. 24)

By "the basic fuel injection quantity calculation unit", a basic fuel injection quantity Tp0 is calculated. By "the control permit unit 1", a flag (fp_cont1) is calculated which permits control for making the air fuel ratio lean based on the instability index (Ind_sta) after start. By "the instability index calculation unit", the instability index (Ind_sta) is calculated which is a variation degree of the angular acceleration meaning instability of combustion. By "the basic fuel injection quantity correction value calculation unit", a basic fuel injection quantity correction value (F_hos) for making the air fuel ratio lean is calculated. By "the control permit unit 2", a flag (fp_cont2) is calculated which permits control for retarding ignition timing based on the efficiency index (Ind_ita) after the air fuel ratio is made lean. By "the efficiency index calculation unit", the engine efficiency index (Ind_ita) is calculated which is a ratio of the engine speed (Ne) and the suction air quantity (Qa). By "the ignition timing correction value calculation unit", an ignition timing correction value (Adv_hos) retarding the ignition timing is calculated. By "the diagnosis permit unit", a flag (fp_diag) permitting diagnosis is calculated. By "the abnormality determination unit", whether or not the HC discharged quantity at the time of start is a predetermined value or less is determined from both values of the efficiency index (Ind_ita) and the instability index (Ind_sta), and, when the HC discharged quantity at the time of start is a predetermined value or more, an abnormality flag (f_MIL) is made 1. Below, the detail of respective calculation units will be described.

<Basic Fuel Injection Quantity Calculation Unit (FIG. 26)>

Figure 26:
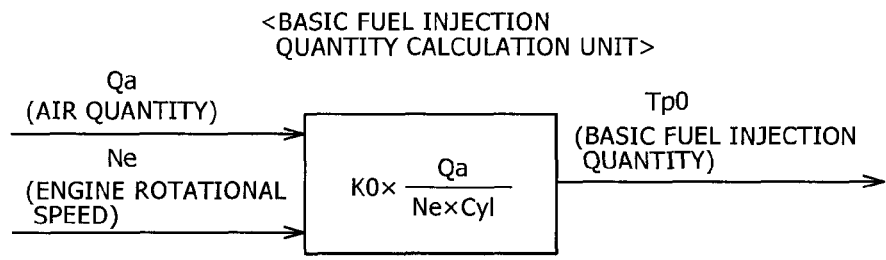
FIG. 26 is a block diagram of a basic fuel injection quantity calculation unit in examples 2-3.

By the present calculation unit, the basic fuel injection quantity (Tp0) is calculated which is specifically shown in FIG. 26, however, because it is same with that of example 2, detail description thereof will be omitted.

<Control Permit Unit 1 (FIG. 27)>

By the present calculation unit, the control permit flag 1 (fp_cont1) is calculated which is specifically shown in FIG. 27, however, because it is same with that of example 2, detail description thereof will be omitted.

<Instability Index Calculation Unit (FIG. 23)>

By the present calculation unit, the instability index (Ind_sta) is calculated which is specifically shown in FIG. 23, however, because it is same with that of example 1, detail description thereof will be omitted.

<Basic Fuel Injection Quantity Correction Value Calculation Unit (FIG. 28).

By the present calculation unit, the basic fuel injection quantity correction value (F_hos) is calculated which is specifically shown in FIG. 28, however, because it is same with that of example 2, detail description thereof will be omitted.

<Control Permit Unit 2 (FIG. 29)>

By the present calculation unit, the control permit flag 2 (fp_cont2) is calculated which is specifically shown in FIG. 29, however, because it is same with that of example 2, detail description thereof will be omitted.

<Instability Index Calculation Unit (FIG. 22)>

By the present calculation unit, the efficiency index (Ind_ita) is calculated which is specifically shown in FIG. 22, however, because it is same with that of example 1, detail description thereof will be omitted.

<Ignition Timing Correction Value Calculation Unit (FIG. 32)>

Figure 32:
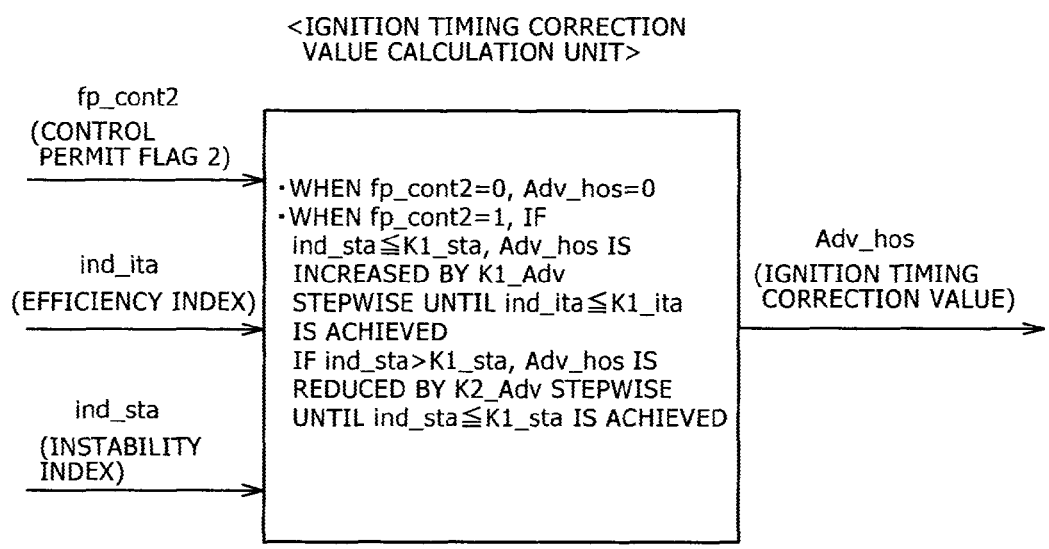
FIG. 32 is a block diagram of an ignition timing correction value calculation unit in example 3.

By the present calculation unit, the ignition timing correction value (Adv_hos) is calculated which is specifically shown in FIG. 32.

When fp_cont2=0, Adv_hos is made 0.

When fp_cont2=1, if ind_sta≤K1_sta, Adv_hos is increased by K1_Adv stepwise until ind_ita≤K1_ita is achieved.

When ind_sta>K1_sta, Adv_hos is reduced by K2_Adv stepwise until ind_sta≤K1_sta is achieved.

As shown in FIG. 17, K1_ita is made an instability index value corresponding to a target HC discharged quantity. Further, it may be changed also based on the operation condition of the engine. It may be changed also based on a change (deterioration) of the light-off performance of the catalyst. More specifically, K1_ita is reduced according to deterioration of the light-off performance of the catalyst.

K1_Adv and K2_Adv are values that determine a retarding speed and an advance speed respectively, and are determined taking responsiveness of the engine and the like into account.

<Diagnosis Permit Unit (FIG. 21)>

By the present calculation unit, the diagnosis permit flag (fp_diag) is calculated which is specifically shown in FIG. 21, however, because it is same with that of example 1, detail description thereof will be omitted.

<Abnormality Determination Unit (FIG. 24)>

By the present calculation unit, the abnormality flag (f_MIL) is calculated which is specifically shown in FIG. 24, however, because it is same with that of example 1, detail description thereof will be omitted.

LIST OF REFERENCE SIGNS

1 . . . air cleaner
2 . . . air flow sensor
3 . . . electronic throttle
4 . . . intake manifold
5 . . . collector
6 . . . accelerator
7 . . . fuel injection valve
8 . . . ignition plug
9 . . . engine
10 . . . exhaust manifold
11 . . . three way catalyst
12 . . . catalyst upstream air fuel ratio sensor
13 . . . accelerator valve opening sensor
14 . . . water temperature sensor
15 . . . engine speed sensor
16 . . . control unit
17 . . . throttle valve opening sensor
18 . . . exhaust gas circulation pipe
19 . . . exhaust gas circulation quantity adjust valve
20 . . . catalyst downstream $O_2$ sensor
21 . . . CPU mounted inside control unit
22 . . . ROM mounted inside control unit
23 . . . RAM mounted inside control unit
24 . . . input circuit of various kinds of sensors mounted inside control unit
25 . . . port inputting various kinds of sensor signals and outputting actuator motion signal
26 . . . ignition output circuit outputting drive signal to ignition plug at appropriate timing
27 . . . fuel injection valve drive circuit outputting appropriate pulse to fuel injection valve
28 . . . electronic throttle drive circuit
29 . . . intake temperature sensor

The invention claimed is:

1. A control device of an engine comprising:
   means for detecting efficiency of the engine;
   means for detecting combustion stability of the engine;
   means for detecting a HC discharged quantity at the time of engine start based on efficiency of the engine and combustion stability of the engine; and
   means for executing a notification when the efficiency of the engine and the combustion stability of the engine do not fall in a predetermined region A1, wherein
      the predetermined region A1 is a range of the efficiency of the engine and the combustion stability of the engine wherein the engine, and
      the HC discharged quantity at the time of engine start is a predetermined value or less.

2. The control device of an engine according to claim 1, wherein
the efficiency of the engine is obtained based on a ratio of an engine speed and an intake air quantity of the engine at the time of idling operation.

3. The control device of an engine according to claim 1, wherein
the combustion stability of the engine is obtained based on a variation degree of angular acceleration of the engine.

4. The control device of an engine according to claim 1, further comprising:
means for controlling the engine so that the efficiency of the engine and the combustion stability of the engine fall in a predetermined region A2.

5. The control device of an engine according to claim 4, further comprising:
means for controlling at least an air fuel ratio or ignition timing of the engine so that the efficiency of the engine and the combustion stability of the engine fall in the predetermined region A2.

6. The control device of an engine according to claim 4, wherein
the control of the engine is stopped when the combustion stability of the engine becomes a predetermined value or more.

7. The control device of an engine according to claim 5, wherein
when the combustion stability of the engine becomes a predetermined value or more,
the air fuel ratio of the engine is controlled to a rich side, or
the ignition timing of the engine is controlled to an advance side.

8. The control device of an engine according to claim 4, wherein
notification is executed when the combustion stability of the engine becomes a predetermined value or more.

9. The control device of an engine according to claim 1, further comprising:
means for changing the predetermined region A1 based on an operation state of the engine or a diagnosis result of a means related to exhaust performance.

10. The control device of an engine according to claim 4, further comprising:
means for changing the predetermined region A2 based on an operation state of the engine or a diagnosis result of a means related to exhaust performance.

11. A control device of an engine, comprising:
an engine efficiency detector that detects efficiency of the engine;
a combustion stability detector that detects combustion stability of the engine;
a HC discharge quantity detector that detects the HC discharged quantity at the time of engine start based on the efficiency of the engine and the combustion stability of the engine; and
a notifier that executes a notification when the efficiency of the engine and the combustion stability of the engine do not fall in a predetermined region A1, wherein
the predetermined region A1 is a range of the efficiency of the engine and the combustion stability of the engine, and
the HC discharged quantity at the time of engine start is a predetermined value or less.

12. The control device of an engine according to claim 11, further comprising:
a controller that controls the engine so that the efficiency of the engine and the combustion stability of the engine fall in a predetermined region A2.

13. The control device of an engine according to claim 12, further comprising:
at least an air fuel ratio controller or an ignition timing controller that control the air fuel ratio or the ignition timing of the engine so that the efficiency of the engine and the combustion stability of the engine fall in the predetermined region A2.

14. The control device of an engine according to claim 11, further comprising:
a predetermined region changer that changes the predetermined region A1 based on an operational state of the engine or a diagnosis result related to exhaust performance.

15. The control device of an engine according to claim 12, further comprising:
a predetermined region changer that changes the predetermined region A2 based on an operational state of the engine or a diagnosis result related to exhaust performance.

* * * * *